(12) United States Patent
Ward

(10) Patent No.: US 11,833,868 B2
(45) Date of Patent: Dec. 5, 2023

(54) TRAILER HITCH SYSTEM INCLUDING ACTUATABLE MULTI-DIRECTIONAL TRAILER HITCH AND METHOD

(71) Applicant: Marcus Brian Ward, Chocowinity, NC (US)

(72) Inventor: Marcus Brian Ward, Chocowinity, NC (US)

(*) Notice: Subject to any disclaimer, the term of this patent is extended or adjusted under 35 U.S.C. 154(b) by 434 days.

(21) Appl. No.: 17/155,654

(22) Filed: Jan. 22, 2021

(65) Prior Publication Data
US 2022/0234403 A1 Jul. 28, 2022

(51) Int. Cl.
| | | |
|---|---|---|
| *B60D 1/06* | (2006.01) | |
| *B60D 1/52* | (2006.01) | |
| *B60D 1/46* | (2006.01) | |
| *B60D 1/02* | (2006.01) | |

(52) U.S. Cl.
CPC ............... *B60D 1/065* (2013.01); *B60D 1/02* (2013.01); *B60D 1/465* (2013.01); *B60D 1/52* (2013.01)

(58) Field of Classification Search
CPC .......... B60D 1/065; B60D 1/02; B60D 1/465; B60D 1/52; B60D 1/06; B60D 1/075; B60D 1/363; B60D 1/38; B60D 1/40; B60D 1/42; B60D 1/44; B60D 1/46; B60D 2001/542; B60D 2001/548
See application file for complete search history.

(56) References Cited

U.S. PATENT DOCUMENTS

| | | | | | |
|---|---|---|---|---|---|
| 3,269,751 | A | * | 8/1966 | Whattoff | B60D 1/46 280/490.1 |
| 4,000,911 | A | * | 1/1977 | Weber | B60D 1/42 280/468 |
| 4,148,499 | A | * | 4/1979 | Johnson | B60D 1/465 280/490.1 |
| 4,360,216 | A | * | 11/1982 | Wiemers | B62D 49/02 172/272 |
| 5,511,813 | A | * | 4/1996 | Kravitz | B60D 1/42 280/495 |
| 5,660,409 | A | * | 8/1997 | Hensley | B60D 1/30 280/492 |

(Continued)

FOREIGN PATENT DOCUMENTS

WO WO-2016070245 A1 * 5/2016 ............. B60D 1/245

*Primary Examiner* — Jacob D Knutson
*Assistant Examiner* — Abigail R Hymel
(74) *Attorney, Agent, or Firm* — Ward and Smith, P.A.; Ryan K. Simmons

(57) ABSTRACT

A multi-directional trailer hitch system may include a mounting frame; a first slide assembly configured to slideably engage with the mounting frame, wherein the first slide assembly is configured to slide longitudinally in and out from the mounting frame; a second slide assembly configured to slideably engage with the first slide assembly, wherein the second slide assembly is configured to slide laterally in a side to side direction relative to the first slide assembly; a third slide assembly configured to slideably engage with the second slide assembly, wherein the third slide assembly is configured to slide vertically in an up and down direction relative to the second slide assembly; and one or more actuators configured to selectively effect slide movement of one or more of the first slide assembly, second slide assembly, and third slide assembly.

19 Claims, 44 Drawing Sheets

(56) References Cited

U.S. PATENT DOCUMENTS

| | | | |
|---|---|---|---|
| 8,091,913 B1* | 1/2012 | White | B60D 1/06 |
| | | | 280/468 |
| 2003/0222426 A1* | 12/2003 | Rosenlund | B60D 1/06 |
| | | | 280/490.1 |
| 2004/0021292 A1* | 2/2004 | Abair | B60D 1/246 |
| | | | 280/456.1 |
| 2019/0322144 A1* | 10/2019 | Shaeff | B60D 1/52 |

* cited by examiner

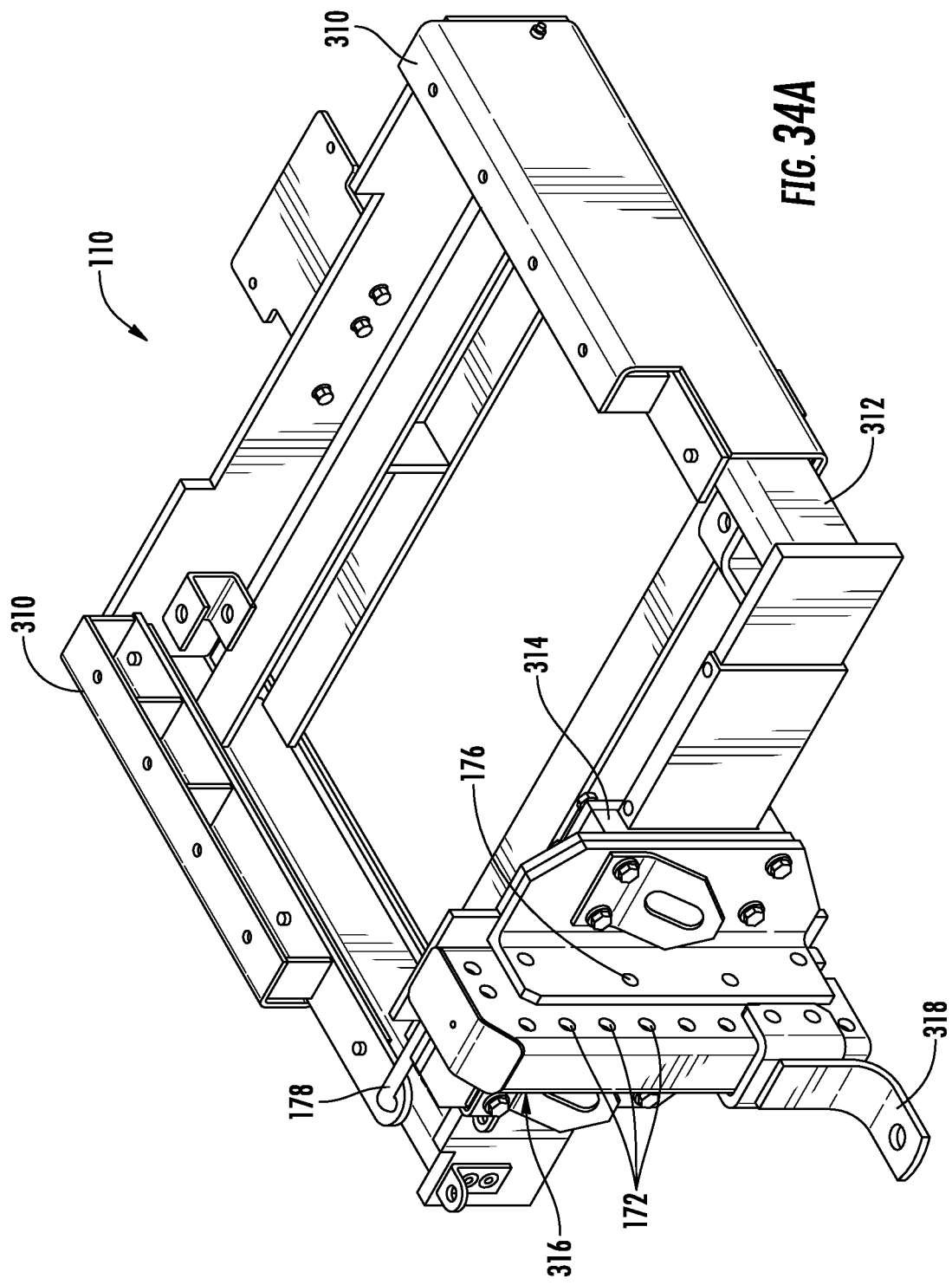

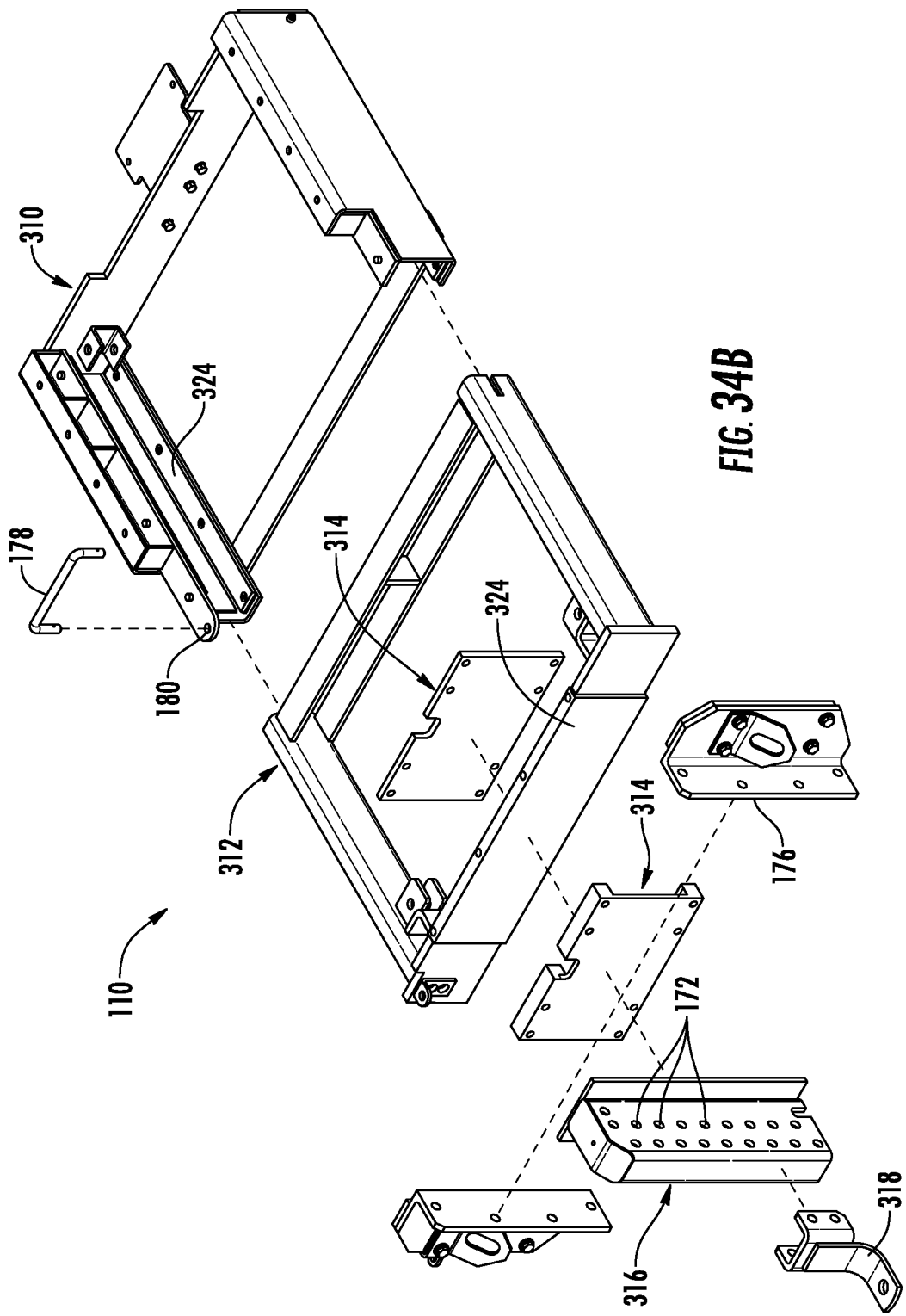

TRAILER HITCH SYSTEM INCLUDING ACTUATABLE MULTI-DIRECTIONAL TRAILER HITCH AND METHOD

RELATED APPLICATIONS

This application is related and claims priority to U.S. Patent Application No. 62/982,308, filed Feb. 27, 2020, entitled "Trailer Hitch System Including Actuatable Multi-Directional Trailer Hitch and Method", the entire disclosure of which is incorporated herein by reference.

TECHNICAL FIELD

The subject matter of the present invention relates generally to trailer hitches for personal and/or commercial vehicles and more particularly to a trailer hitch system including an actuatable multi-directional trailer hitch and method.

BACKGROUND

Hooking up a trailer to a vehicle requires backing up to the trailer, connecting the trailer coupler to the trailer hitch ball, securing the safety chains, and plugging in the wiring harness. This process requires patience and attention to detail and is difficult for the driver of the vehicle to do alone. Consequently, often a first step of hitching up a trailer is to find a friend to help you. Having someone else outside the vehicle to give guidance will make the process much easier. Accordingly, new approaches are needed for hooking up a trailer to a vehicle, especially when the driver of the vehicle is alone and there is no other person outside the vehicle providing guidance.

SUMMARY

In one embodiment, a multi-directional trailer hitch system is provided. The multi-directional trailer hitch system may include a mounting frame; a first slide assembly configured to slideably engage with the mounting frame, wherein the first slide assembly is configured to slide in and out from the mounting frame; a second slide assembly configured to slideably engage with the first slide assembly, wherein the second slide assembly is configured to slide horizontally in a side to side direction relative to the first slide assembly; a third slide assembly configured to slideably engage with the second slide assembly, wherein the third slide assembly is configured to slide vertically in an up and down direction relative to the second slide assembly; and one or more actuators configured to selectively effect slide movement of one or more of the first slide assembly, second slide assembly, and third slide assembly. The multi-directional trailer hitch system may further include a controller configured to selectively effect slide movement of one or more of the first slide assembly, second slide assembly, and third slide assembly. The controller may be one of wired or wireless. The multi-directional trailer hitch system may further include one or more locking mechanisms configured to lock the slide movement of one or more of the first slide assembly, second slide assembly, and third slide assembly. The one or more locking mechanisms may include one or more locking pins and one or more locking pin receivers. The mounting frame may be configured to be mountable to a rear underside portion of a vehicle. The multi-directional trailer hitch system may further include a hydraulic pump. The multi-directional trailer hitch system may further include one or more hydraulic actuators configured to effect the slide movement of one or more of the first slide assembly, second slide assembly, and third slide assembly. The multi-directional trailer hitch system may further include one or more control valves associated with the one or more hydraulic actuators, wherein the control valves may be configured to control the flow of hydraulic fluid in and out of its corresponding one of the one or more hydraulic actuators. The multi-directional trailer hitch system may further include a hydraulic fluid reservoir. The multi-directional trailer hitch system may further include one or more wear protection members disposed on one or more surfaces of the mounting frame and the first slide assembly that are in face to face slideable contact with each other, one or more surfaces of the first slide assembly and second slide assembly that are in face to face slideable contact with each other, and/or one or more surfaces of the second slide assembly and third slide assembly that are in face to face slideable contact with each other. The one or more wear protection members may include brass or Teflon material. The multi-directional trailer hitch system may further include a trailer hitch connector mounted to the third slide assembly, wherein movement of any one or more of the first slide assembly, second slide assembly, and third slide assembly translates into movement of the trailer hitch connector in a like manner. The multi-directional trailer hitch system may be configured to move the trailer hitch connector in any one of six different directions relative to the mounting frame. The trailer hitch connector may include a trailer hitch ball. The six different directions may include in and out, side-to-side, and up and down relative to the mounting frame.

In another embodiment, a method of using a multi-directional trailer hitch system is provided. The method may include positioning a vehicle in close proximity to an object to be towed, wherein the vehicle may include the multi-directional trailer hitch system and the object to be towed may include a hitch receiver suitable for coupling with the multi-directional trailer hitch system. The multi-directional trailer hitch system may include a mounting frame; a first slide assembly configured to slideably engage with the mounting frame, wherein the first slide assembly is configured to slide in and out from the mounting frame; a second slide assembly configured to slideably engage with the first slide assembly, wherein the second slide assembly is configured to slide horizontally in a side to side direction relative to the first slide assembly; a third slide assembly configured to slideably engage with the second slide assembly, wherein the third slide assembly is configured to slide vertically in an up and down direction relative to the second slide assembly; a trailer hitch connector mounted to the third slide assembly; and one or more actuators configured to selectively effect slide movement of one or more of the first slide assembly, second slide assembly, and third slide assembly. The method may further include activating the multi-directional trailer hitch system; positioning the hitch connector of the multi-directional trailer hitch system to a desired position for coupling to the hitch receiver of the object to be towed; coupling the hitch connector to the hitch receiver of the object to be towed; positioning the multi-directional trailer hitch system with object to be towed coupled thereto to a towing position; and securing the multi-directional trailer hitch system in the towing position. The multi-directional trailer hitch system may further include a controller, wherein the controller may be configured to effect positioning of the multi-directional trailer hitch system. The multi-directional trailer hitch system may be configured to move the hitch connector in any one of six different directions relative to the mounting frame. The hitch connector may include a trailer hitch ball.

BRIEF DESCRIPTION OF THE DRAWINGS

Figure 1:
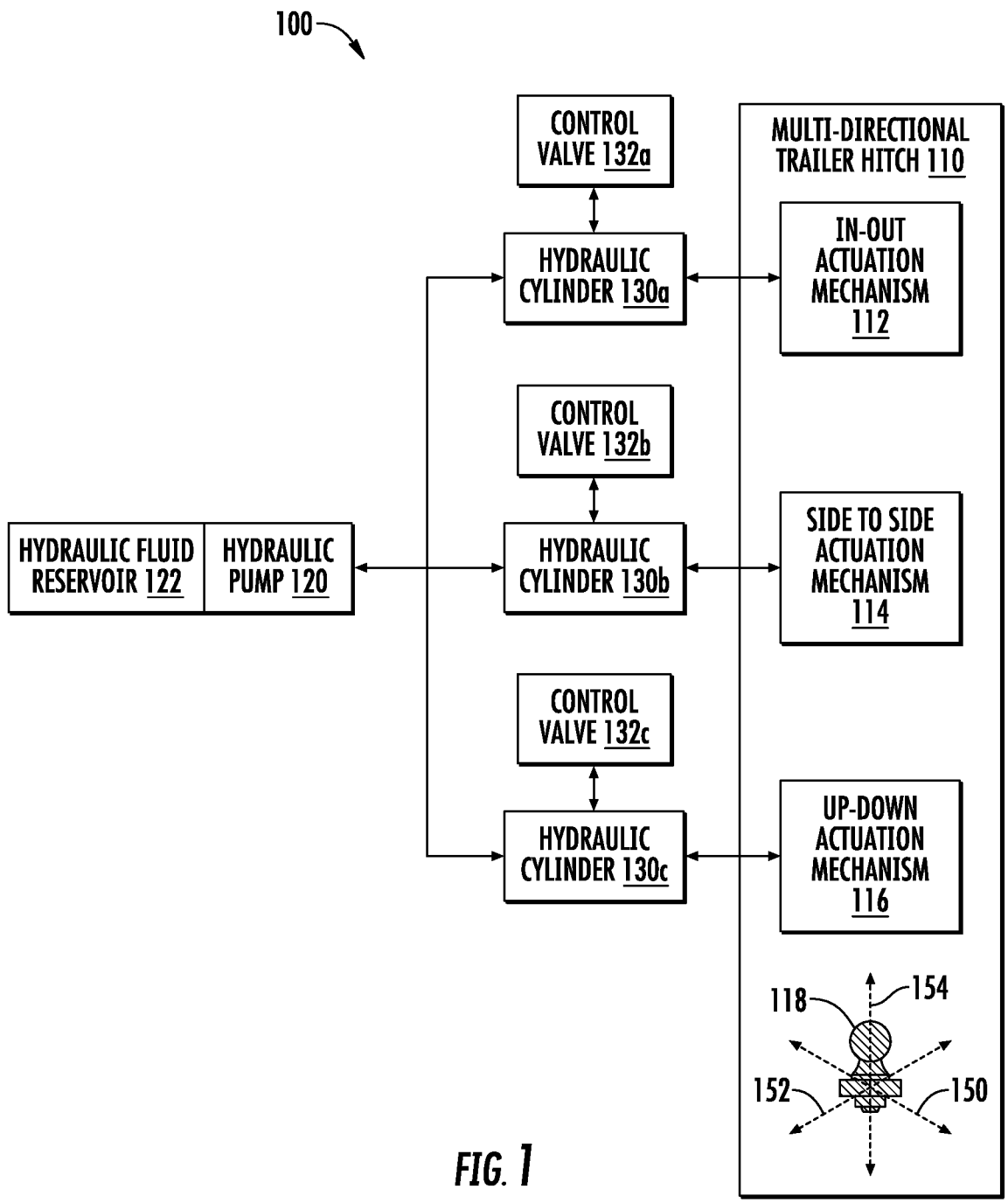
Figure 2:
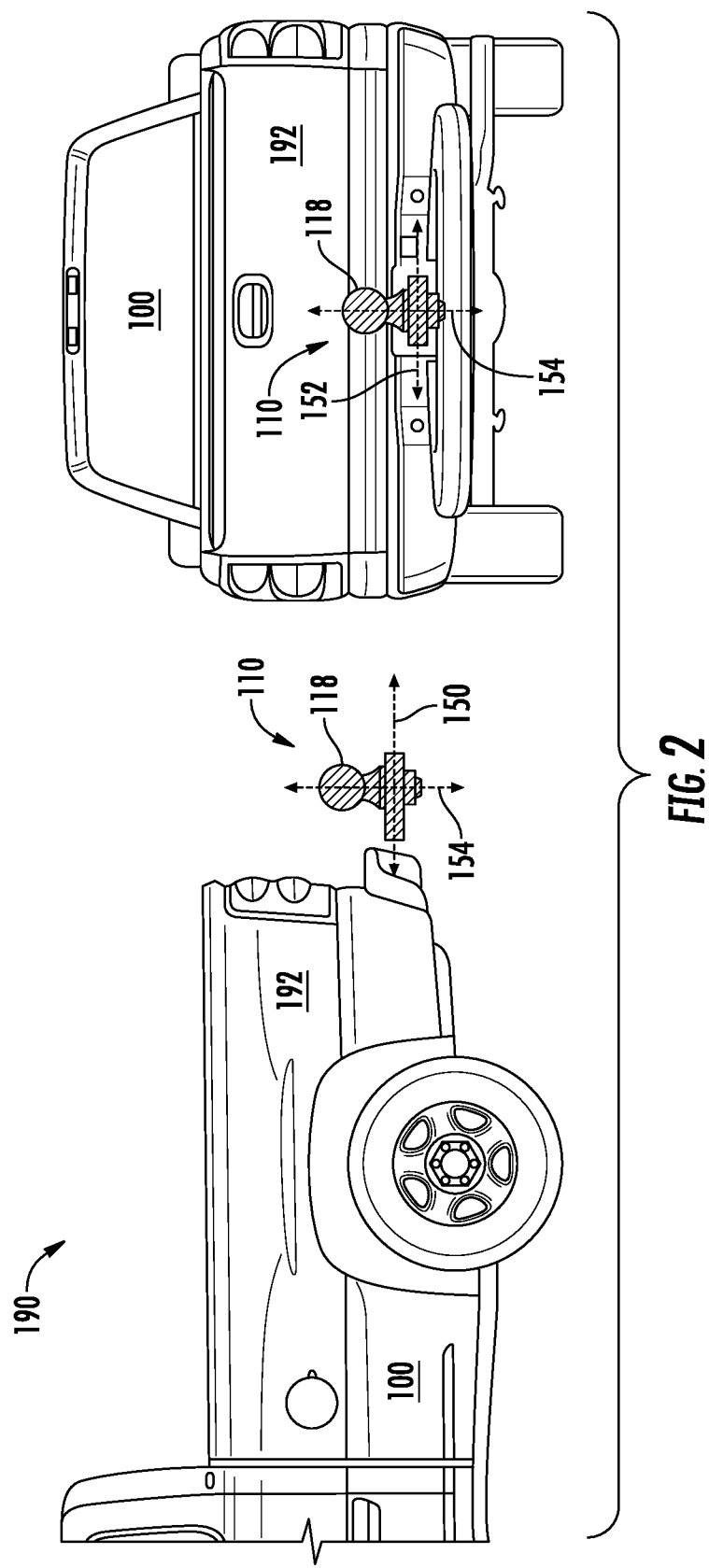
Figure 13:
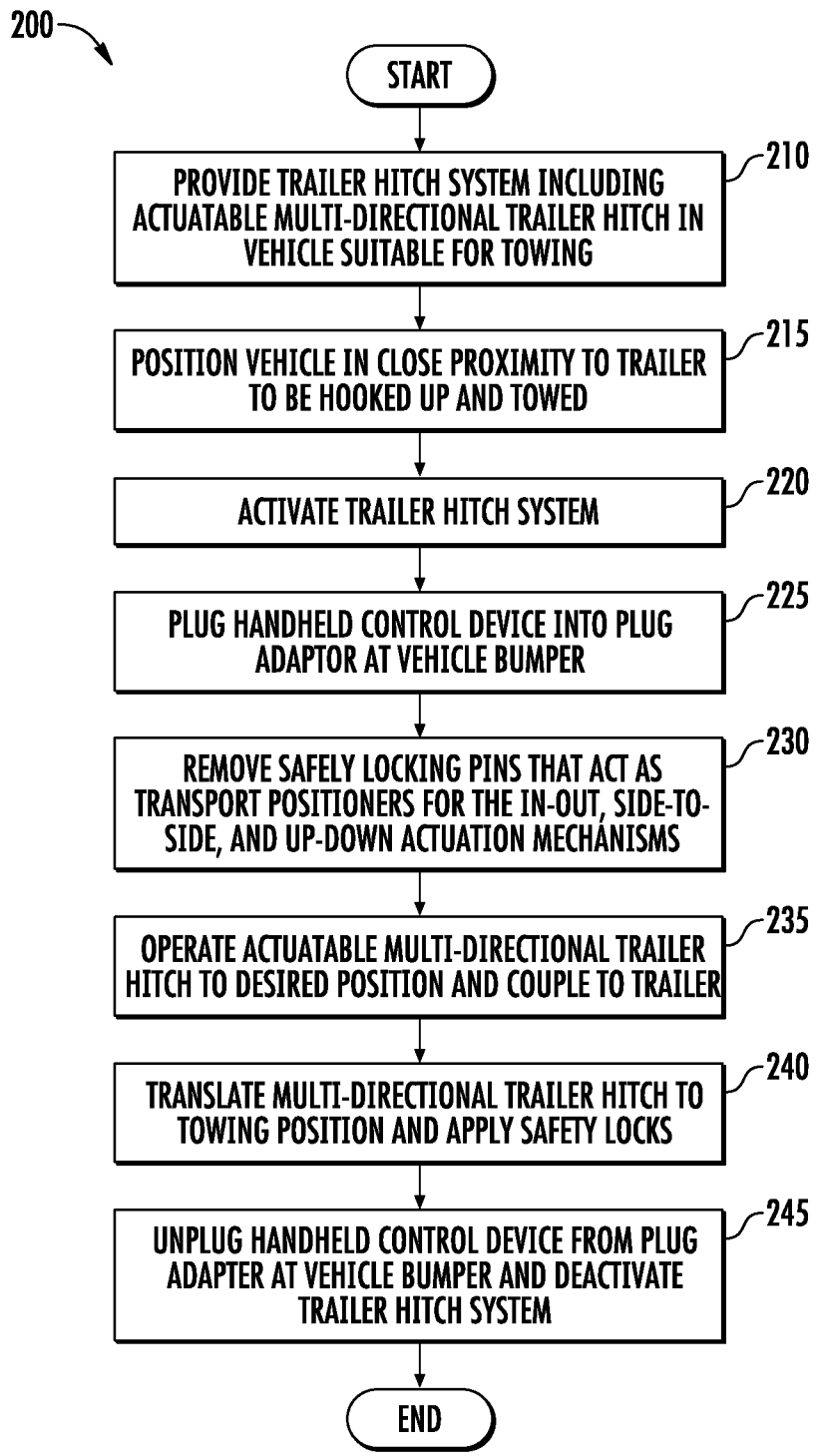
Figure 14:
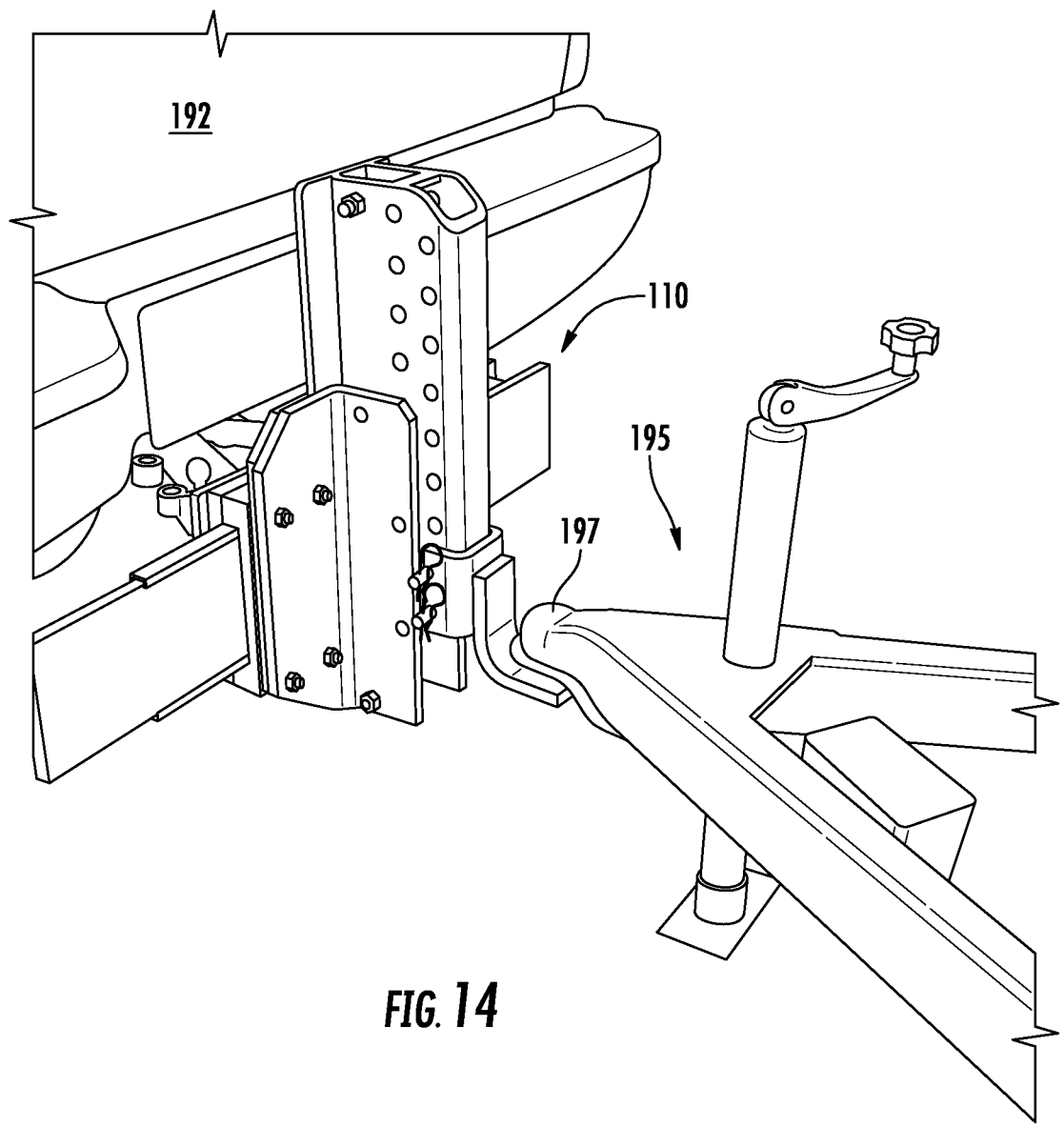
Figure 15:
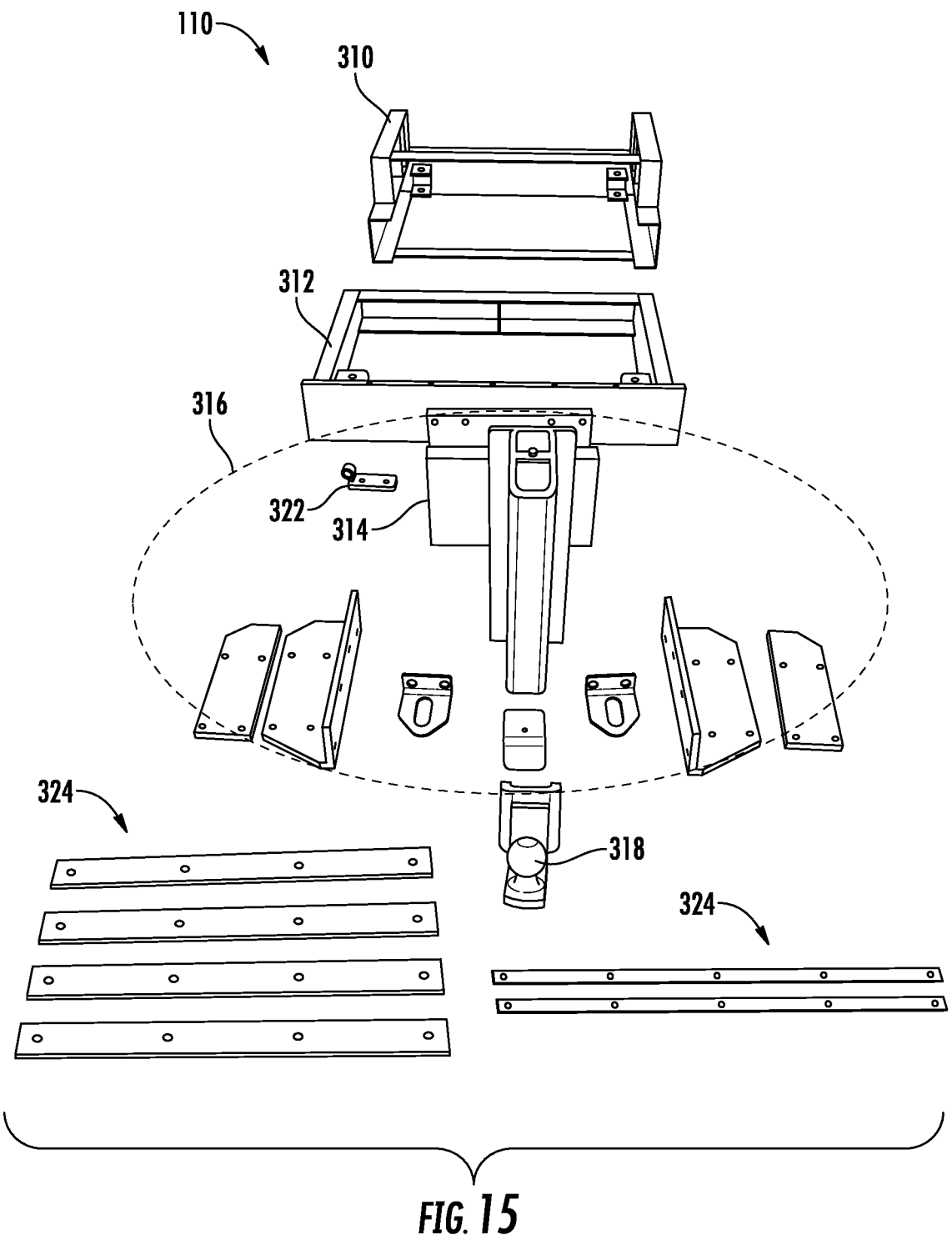
Figure 16:
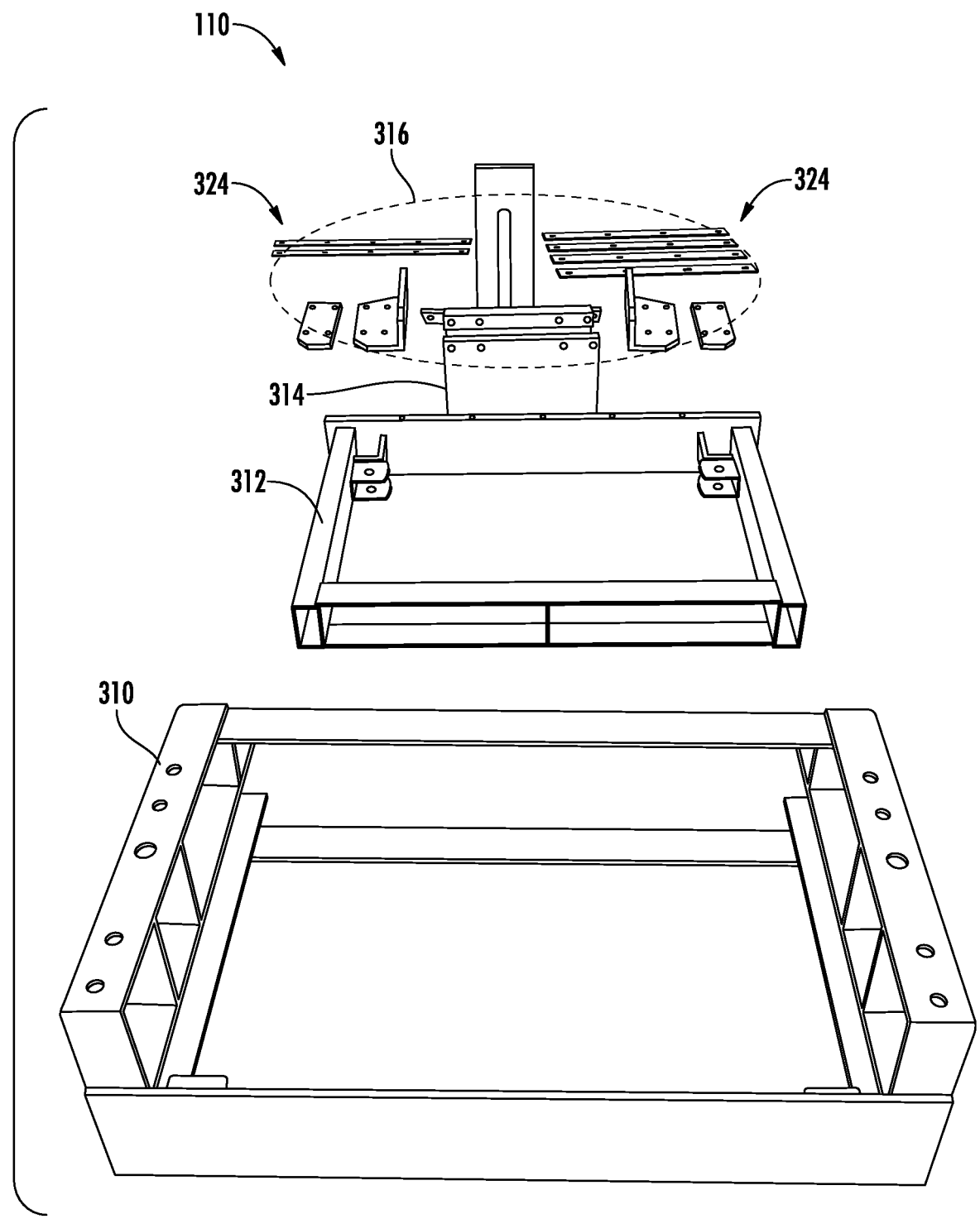
Figure 17:
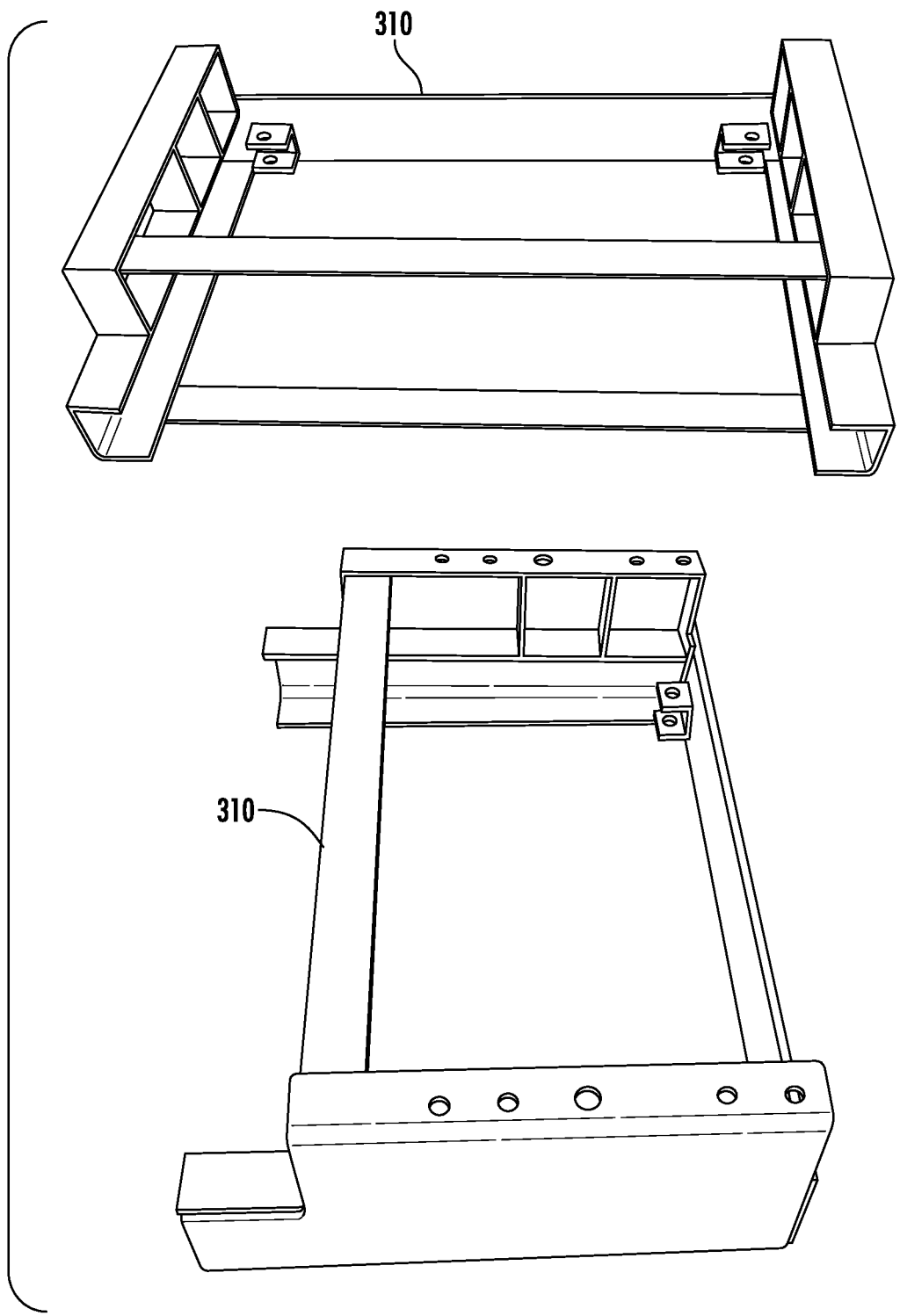
Figure 18:
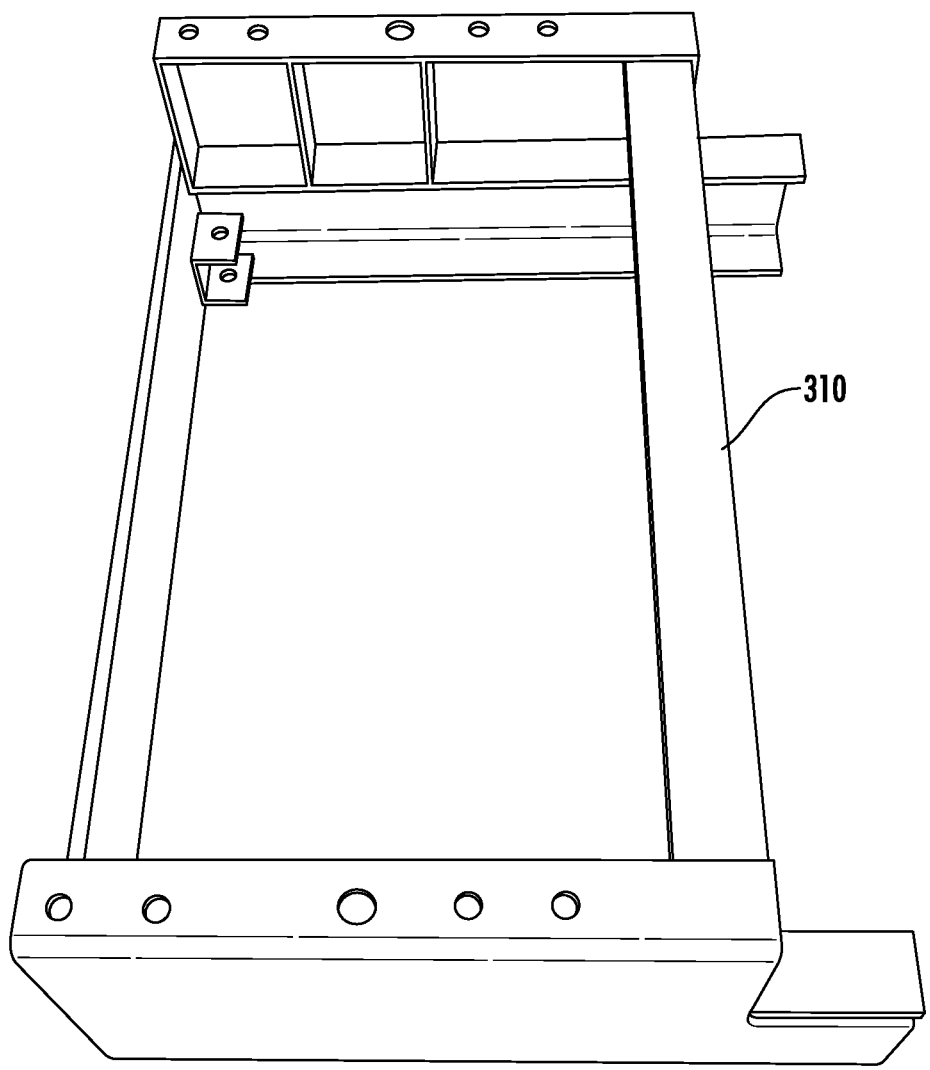
Figure 19:
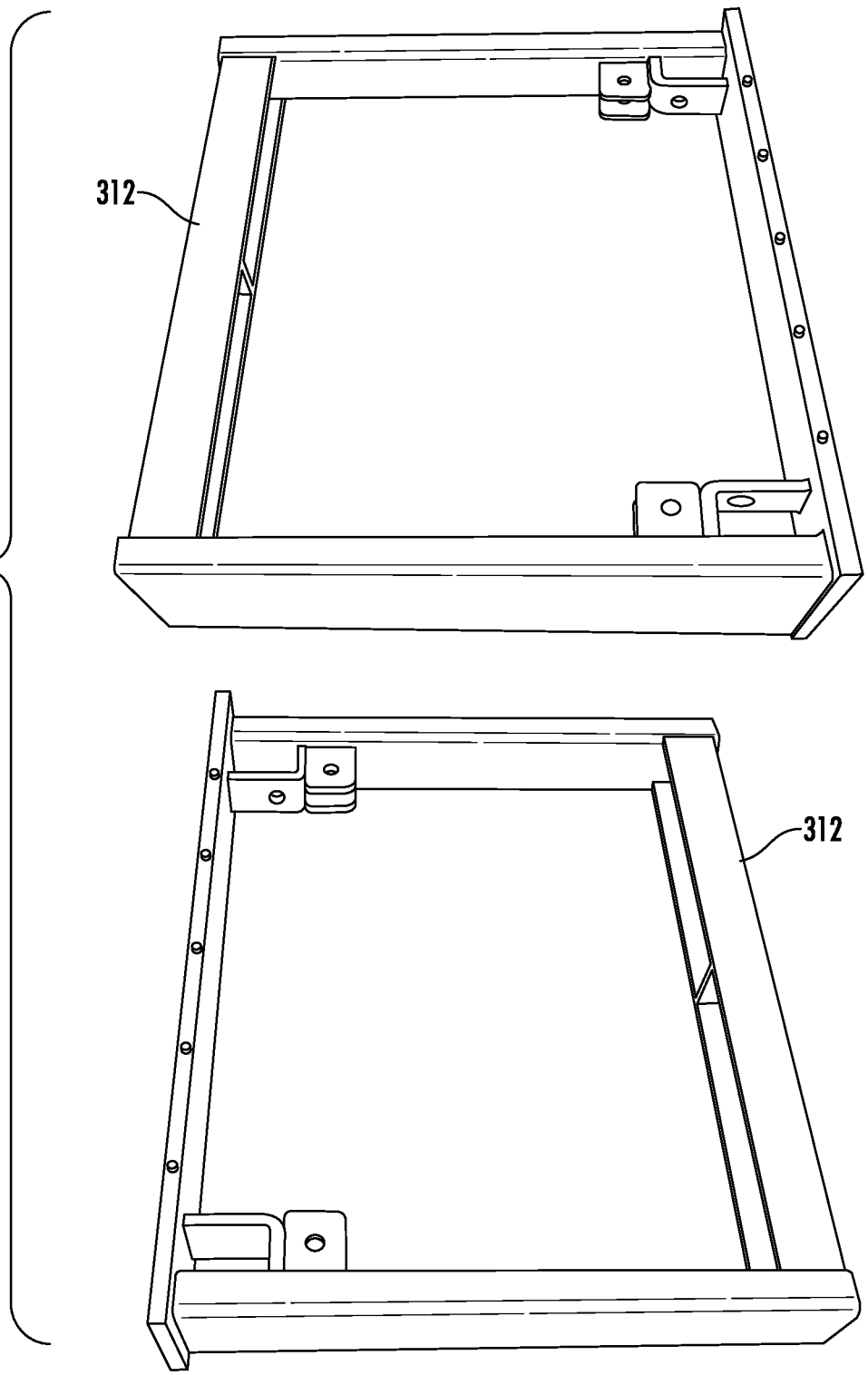
Figure 20:
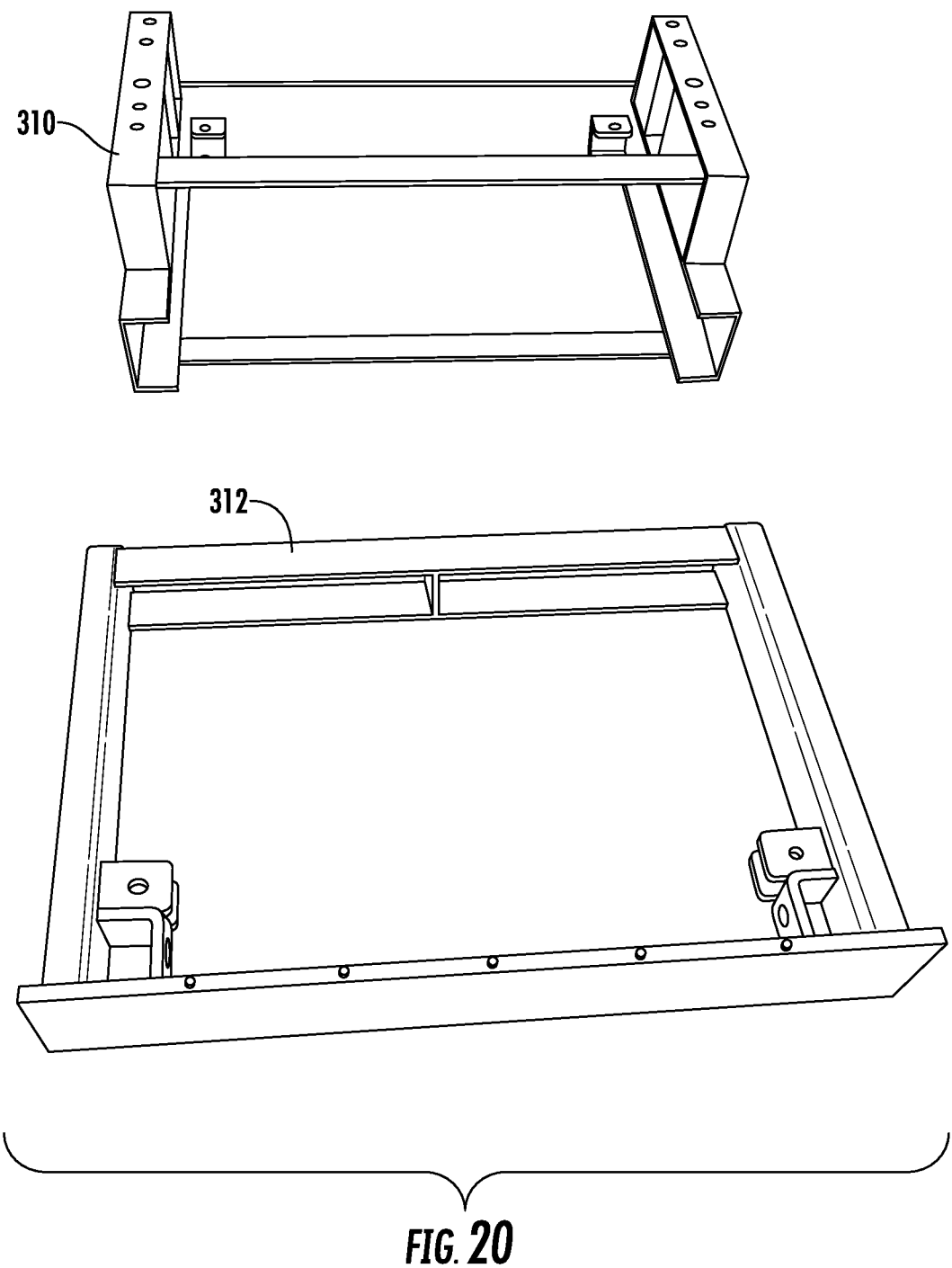
Figure 21:
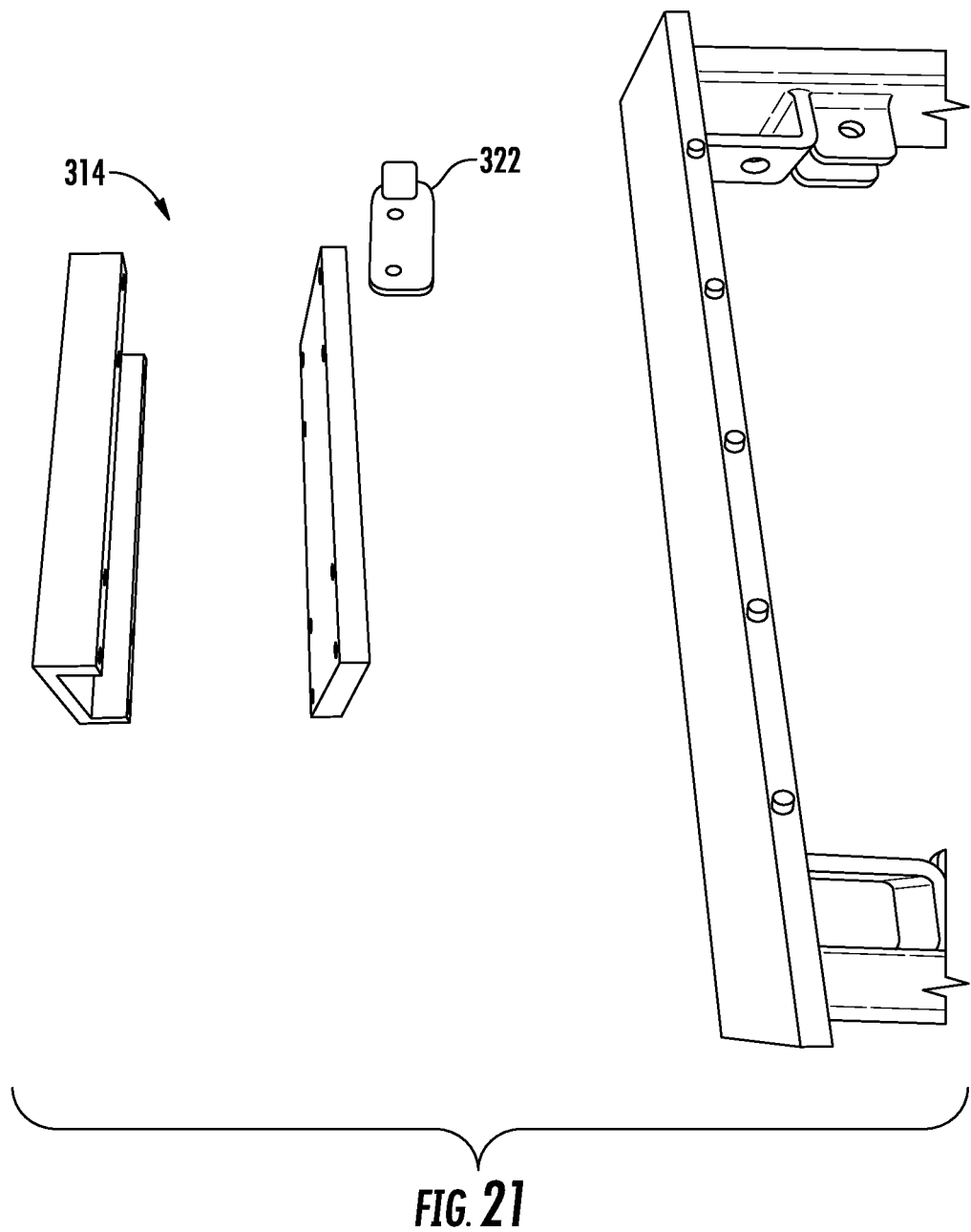
Figure 22:
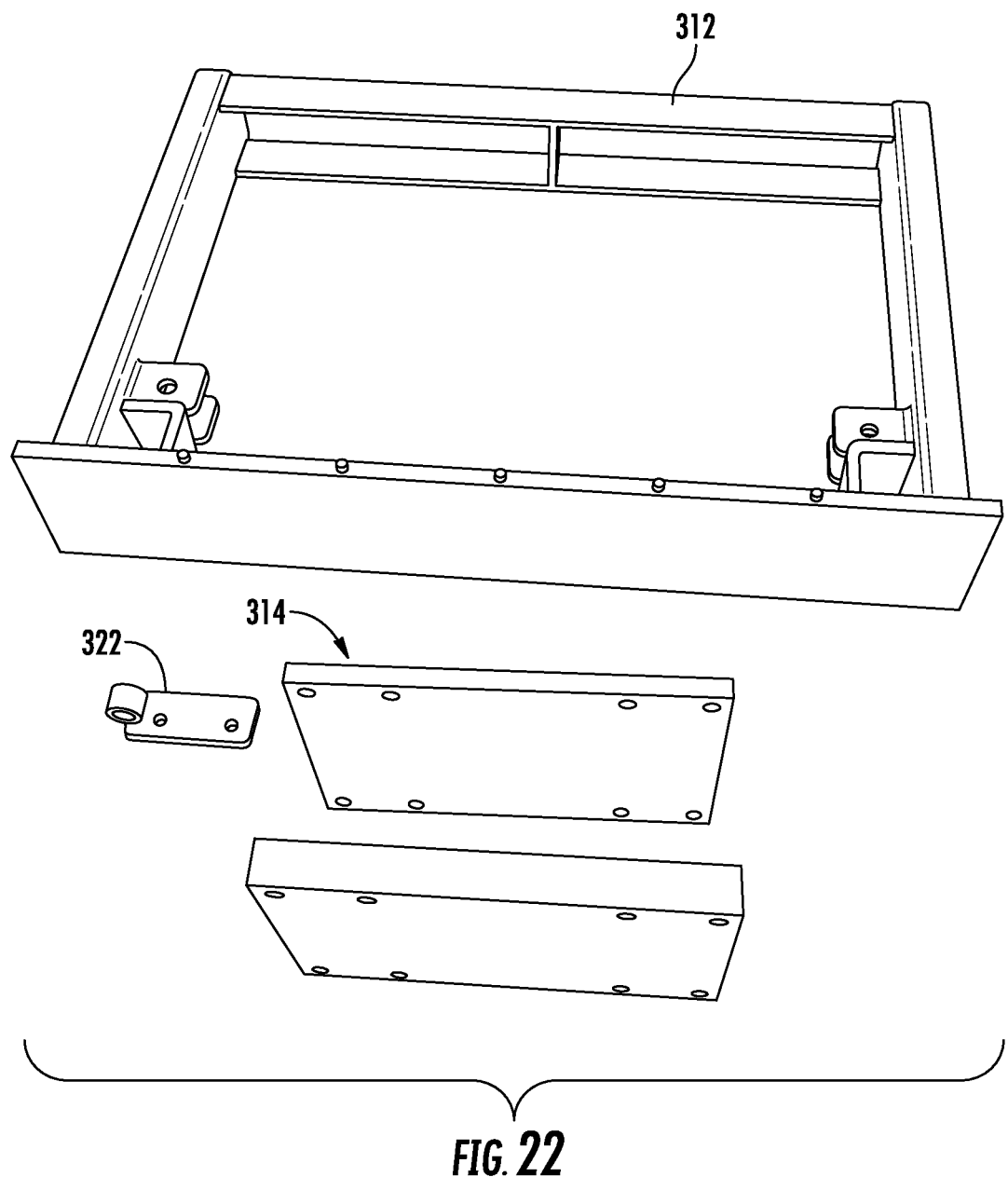
Figure 23:
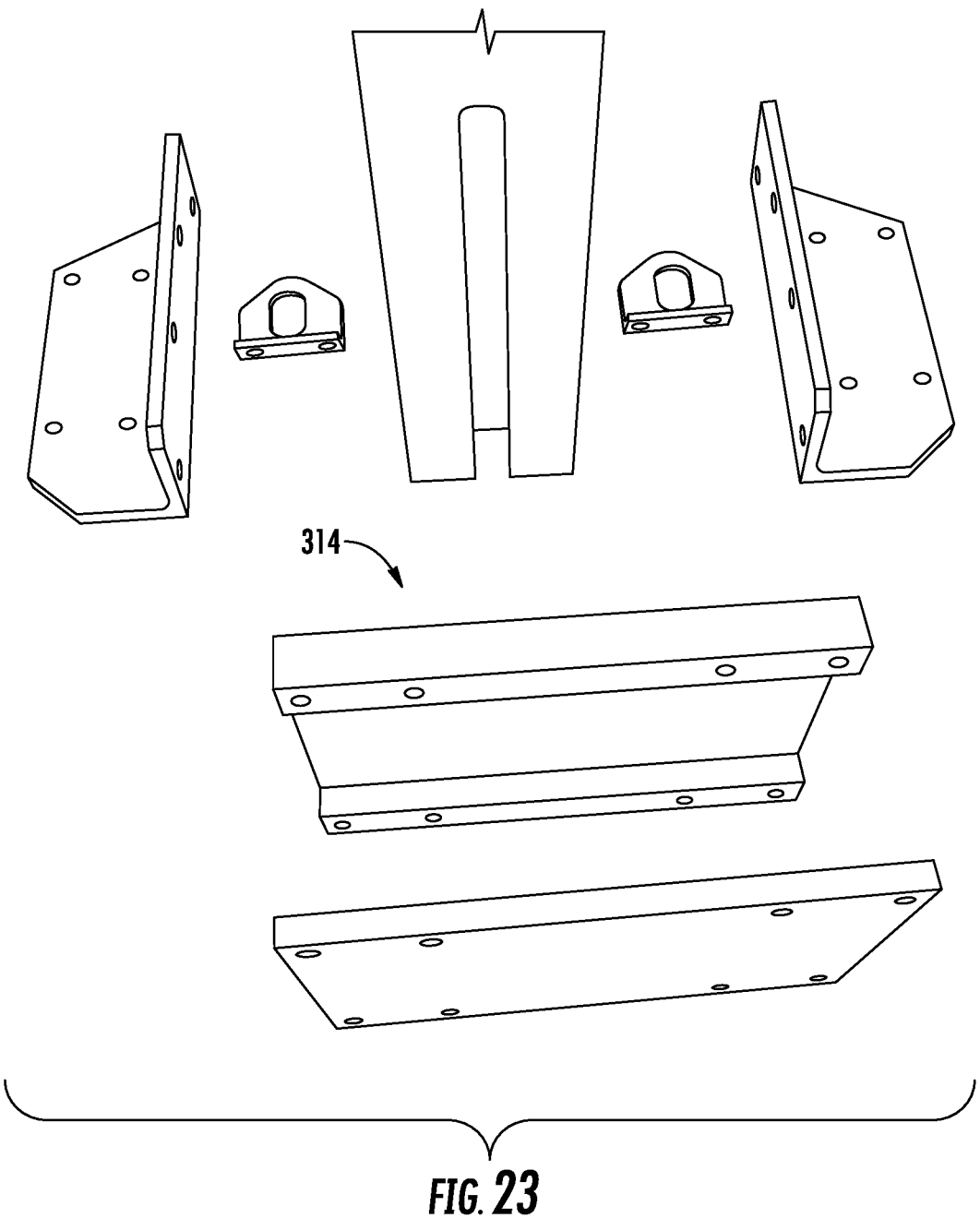
Figure 24:
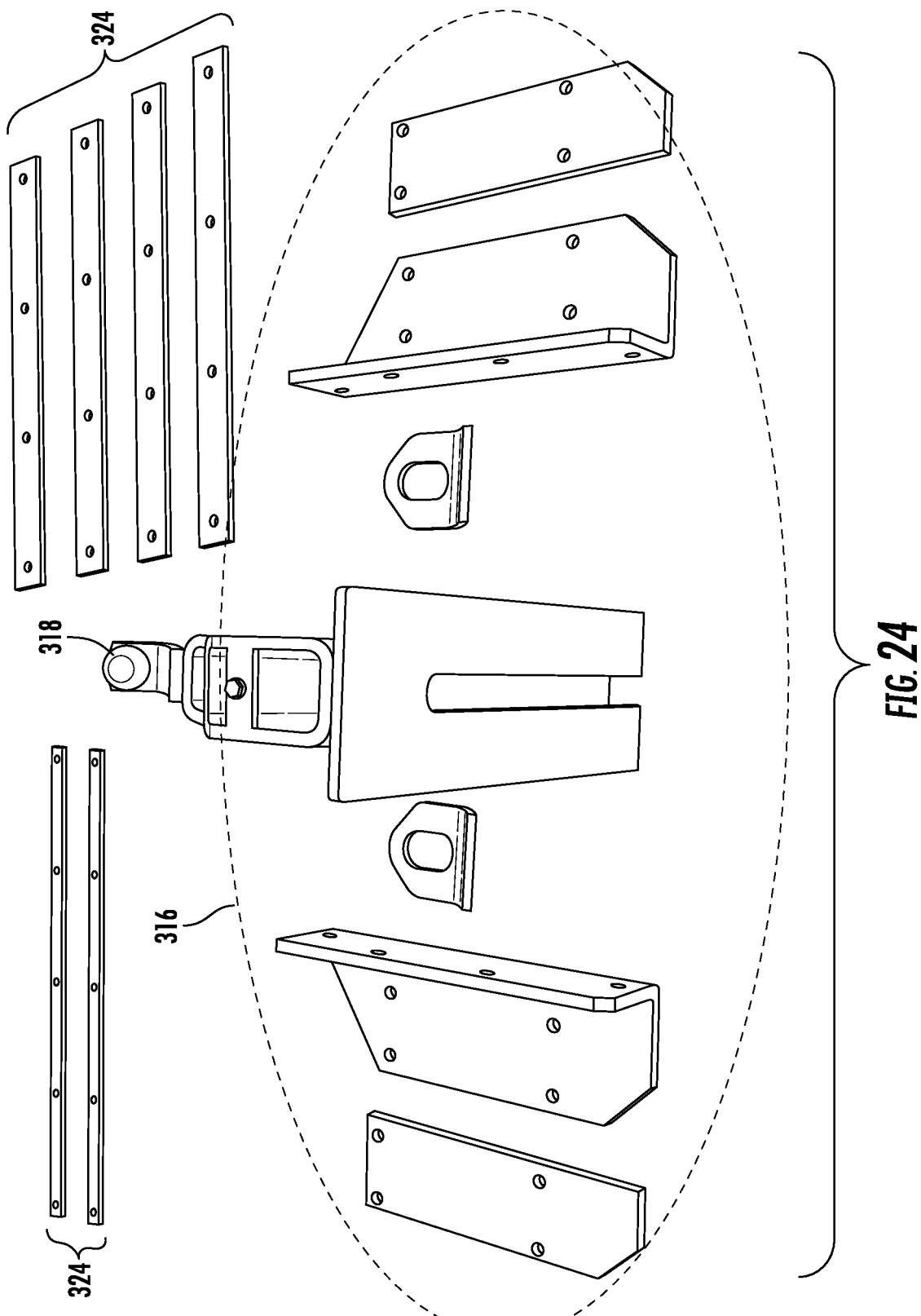
Figure 25:
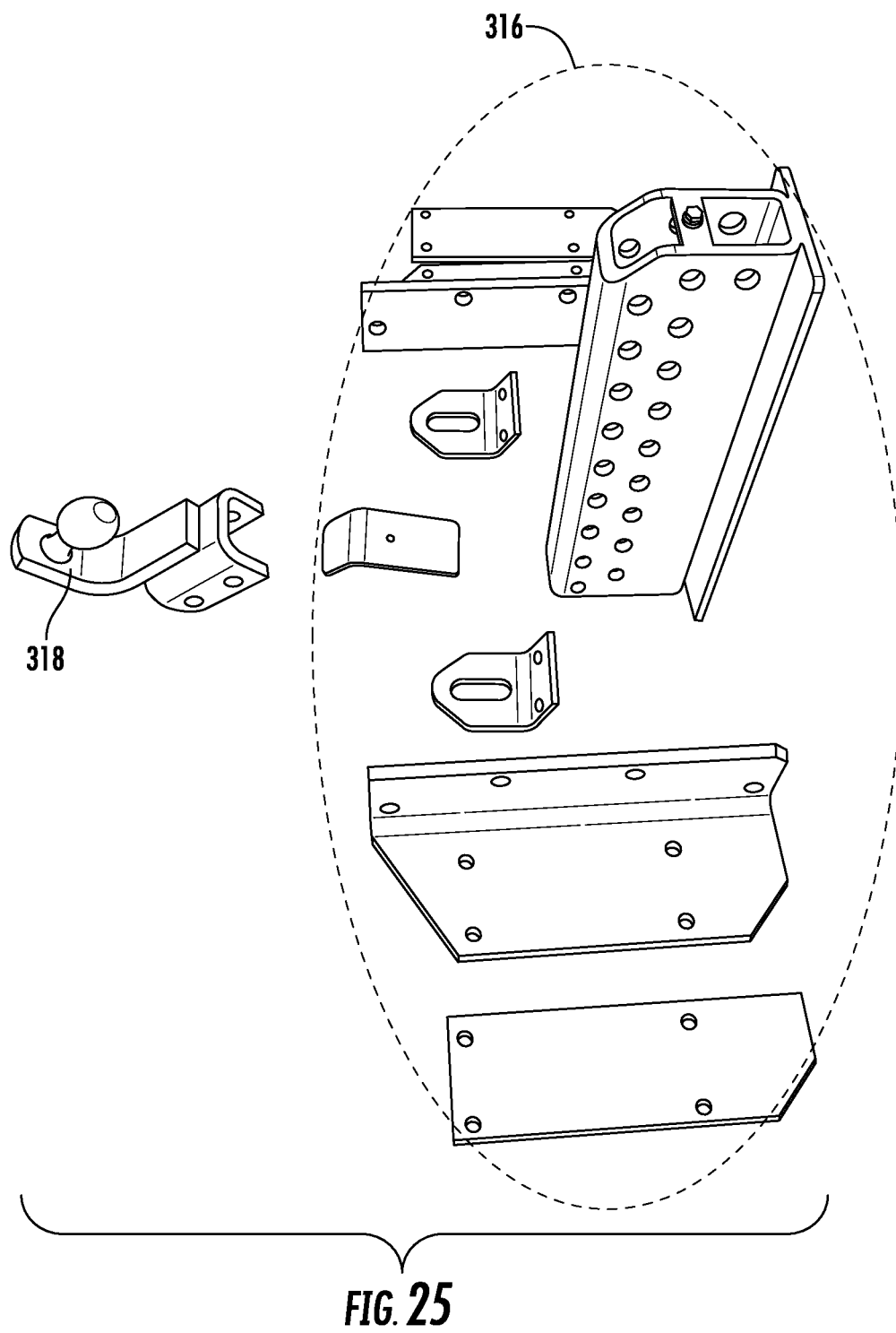
Figure 26:
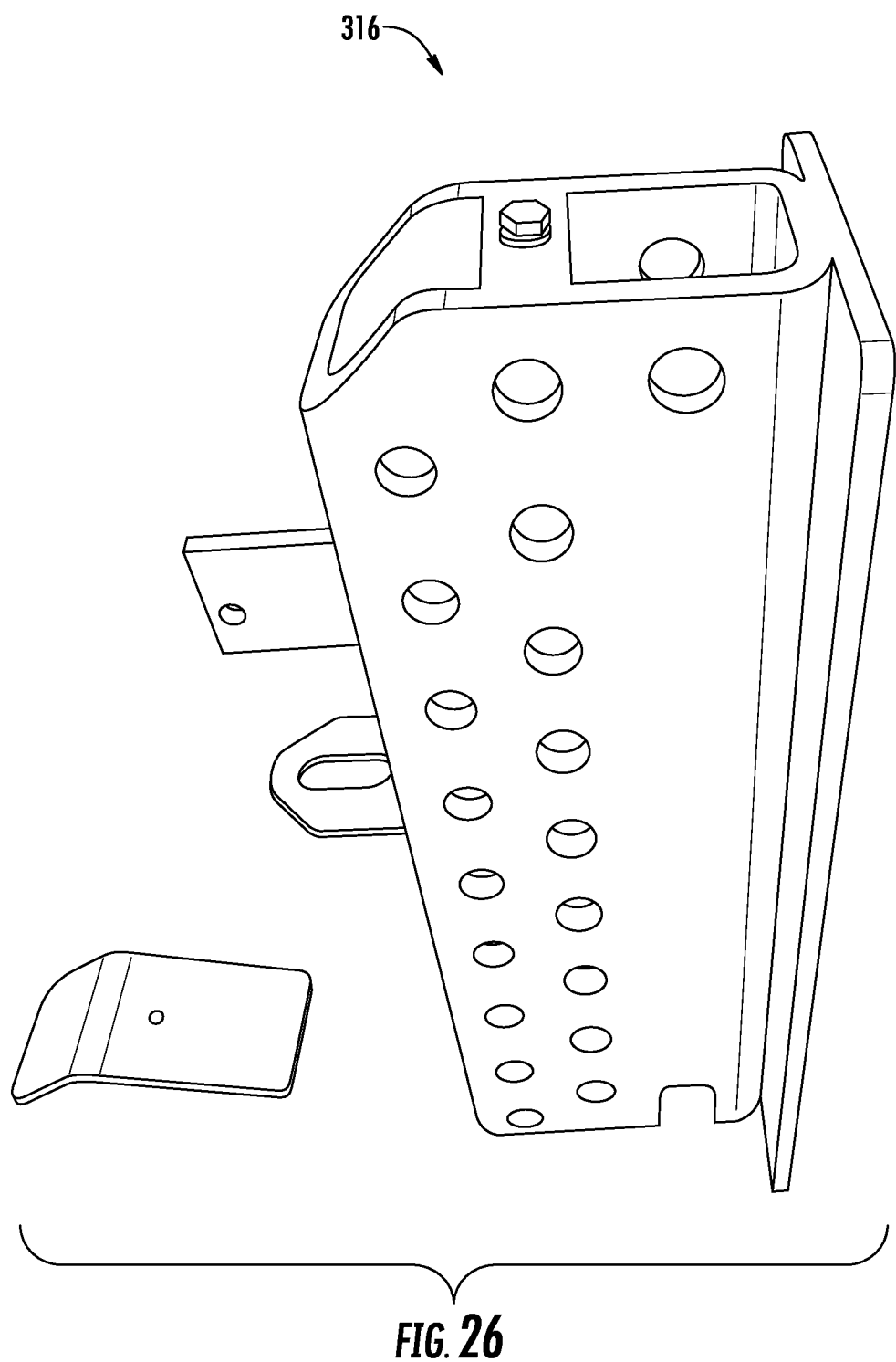
Figure 27:
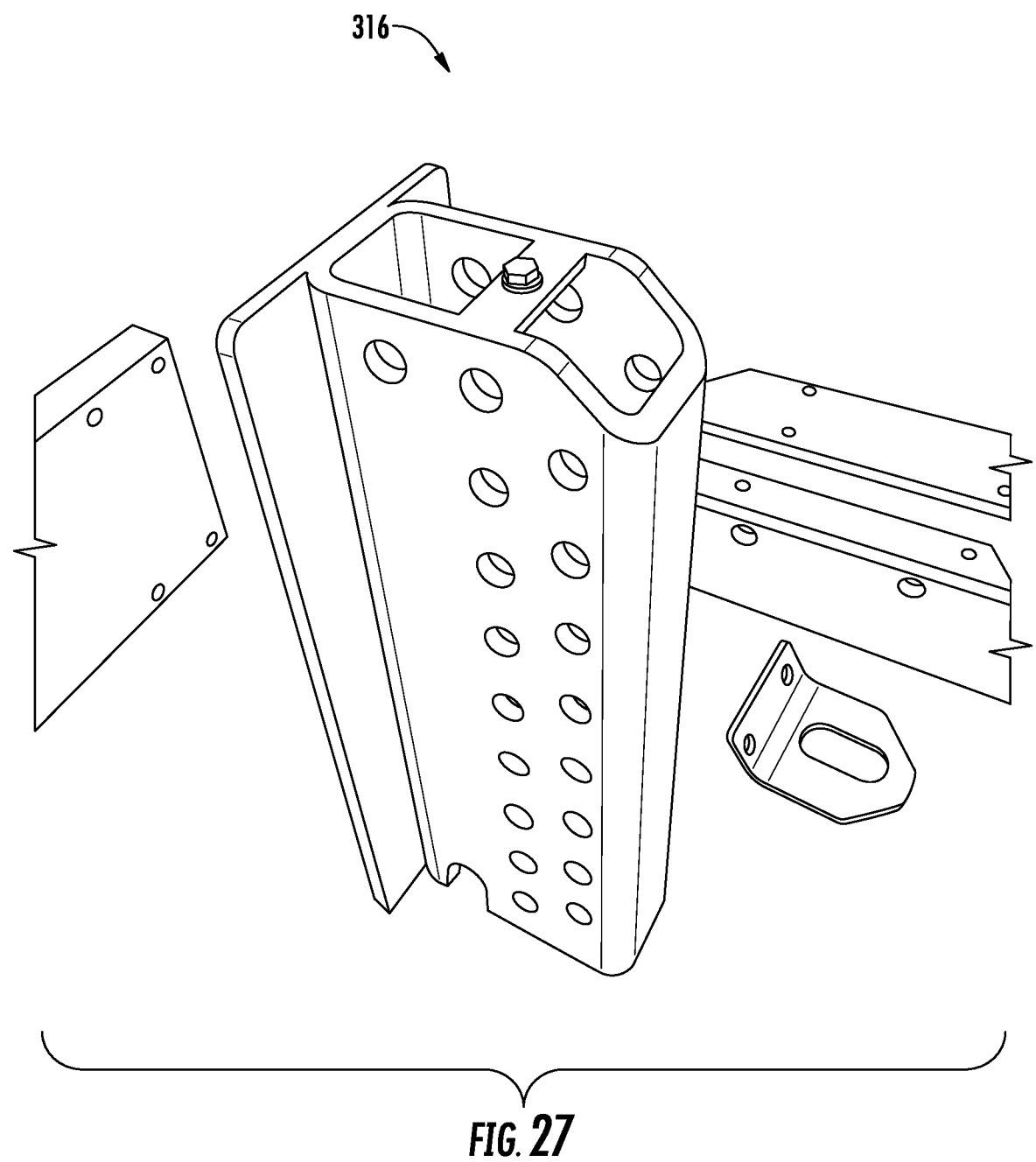
Figure 28:
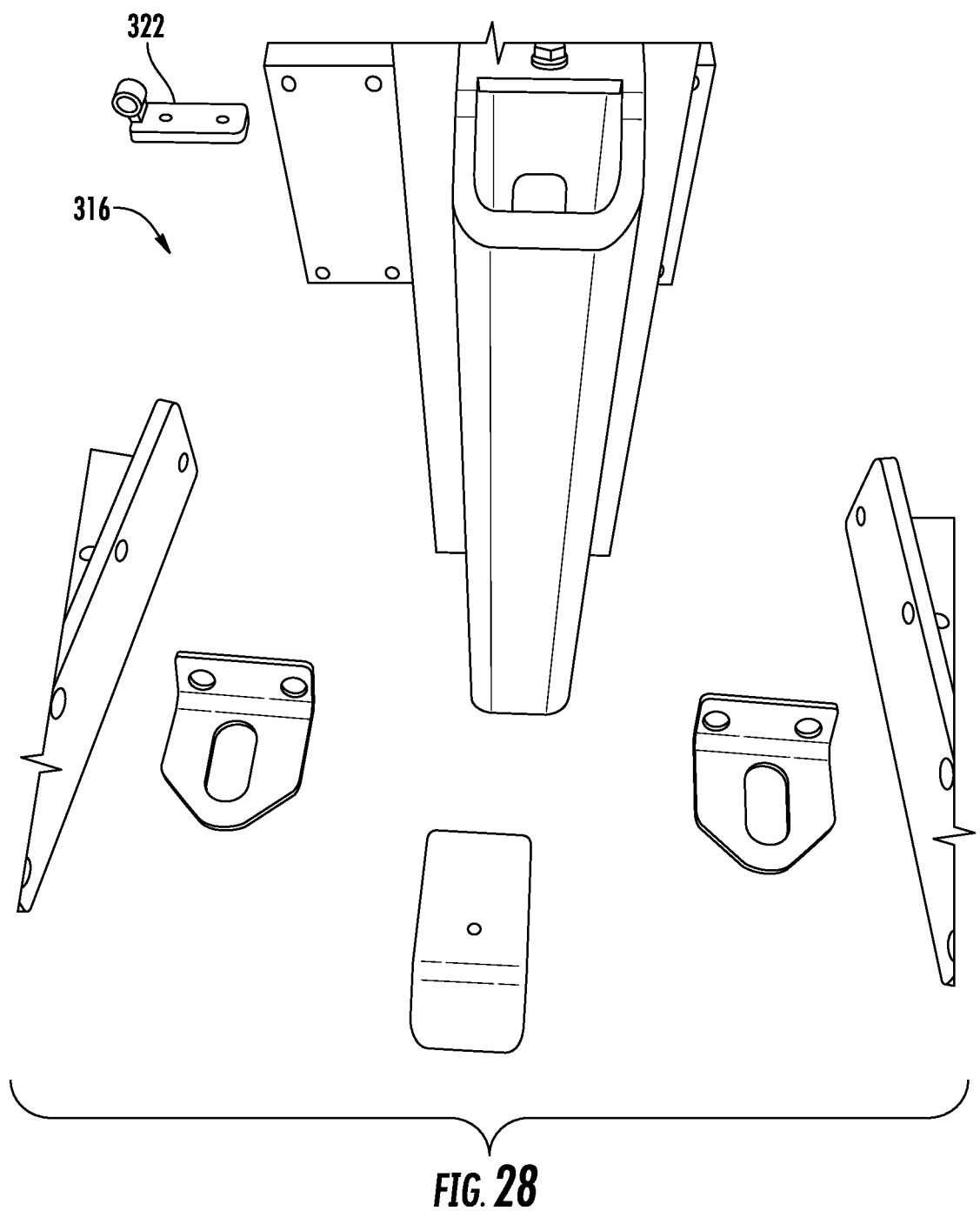
Figure 29:
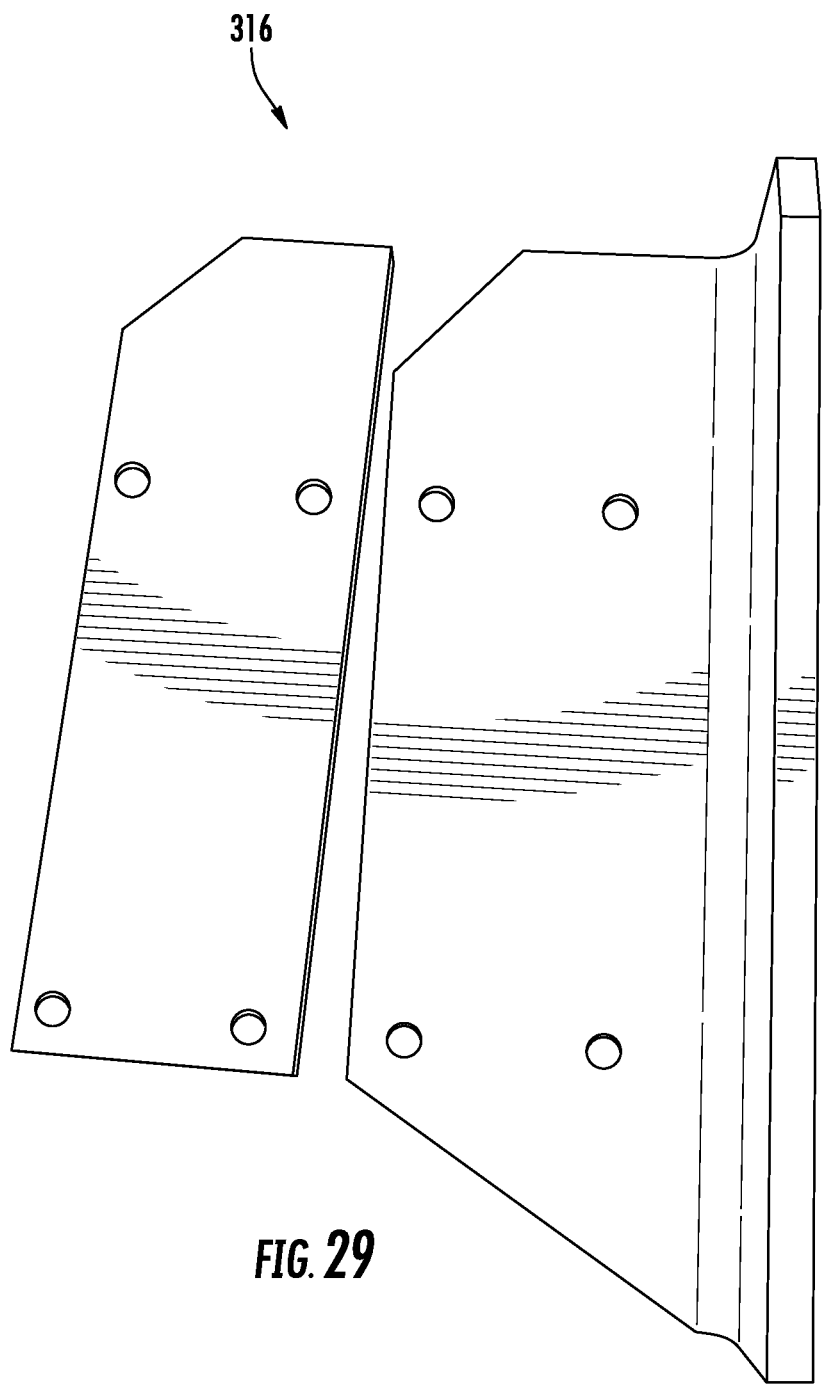
Figure 30:
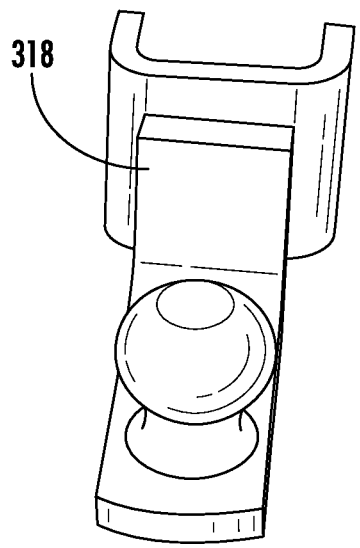
Figure 31:
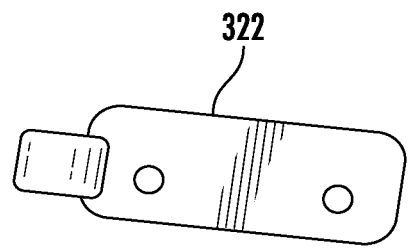
Figure 32:
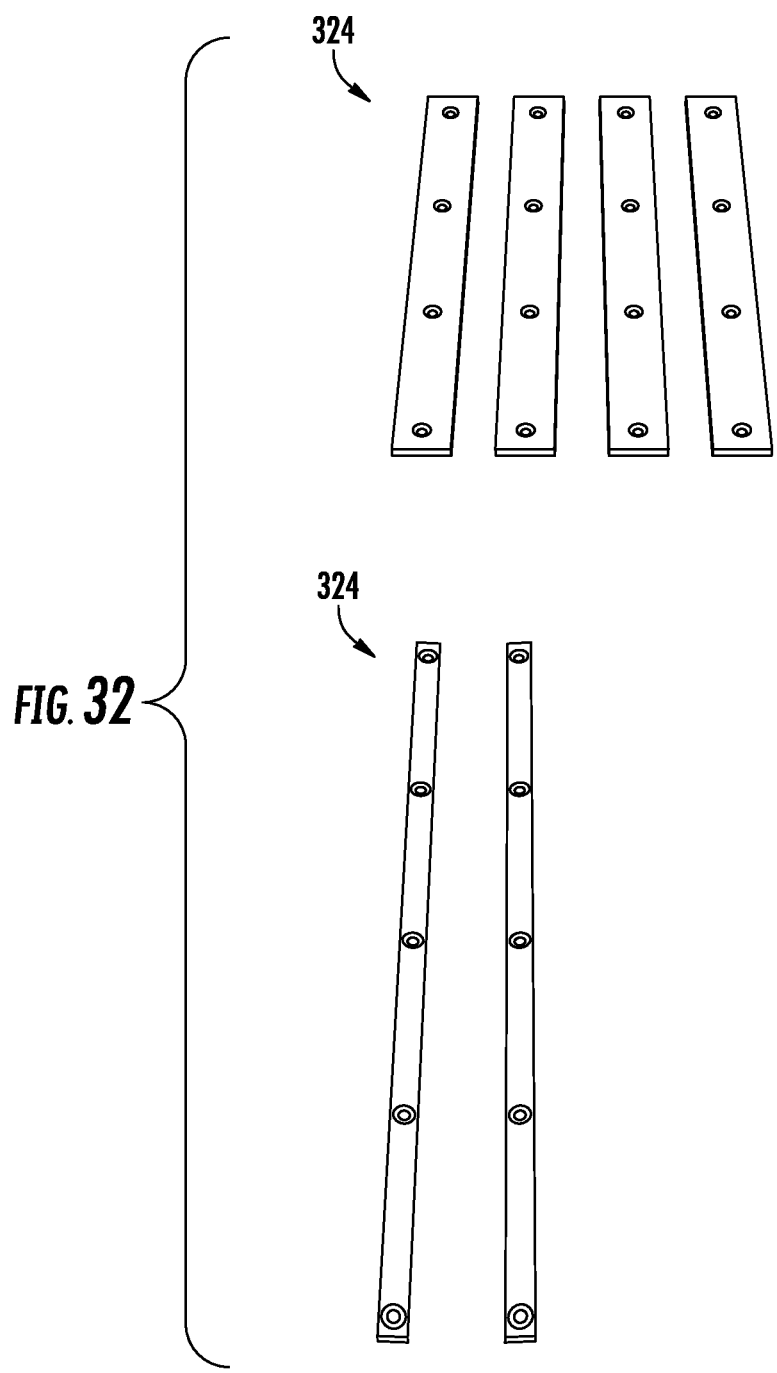
Figure 33:
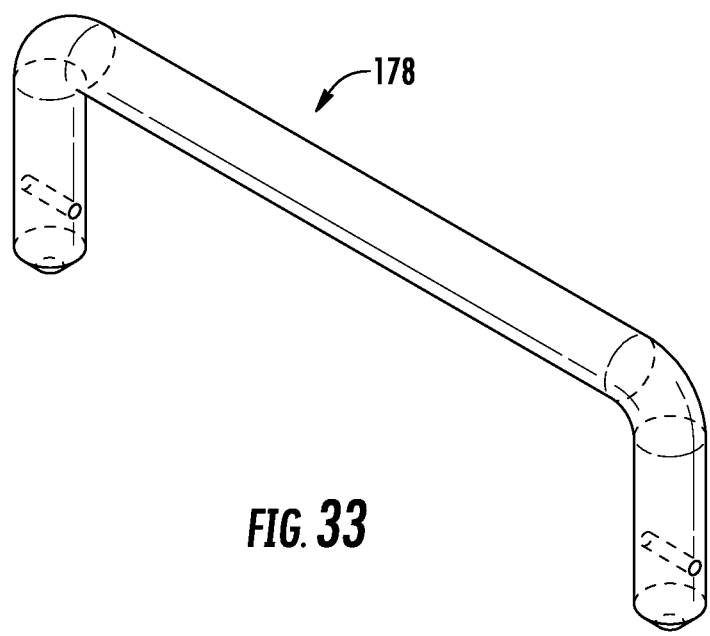
Figure 35A:
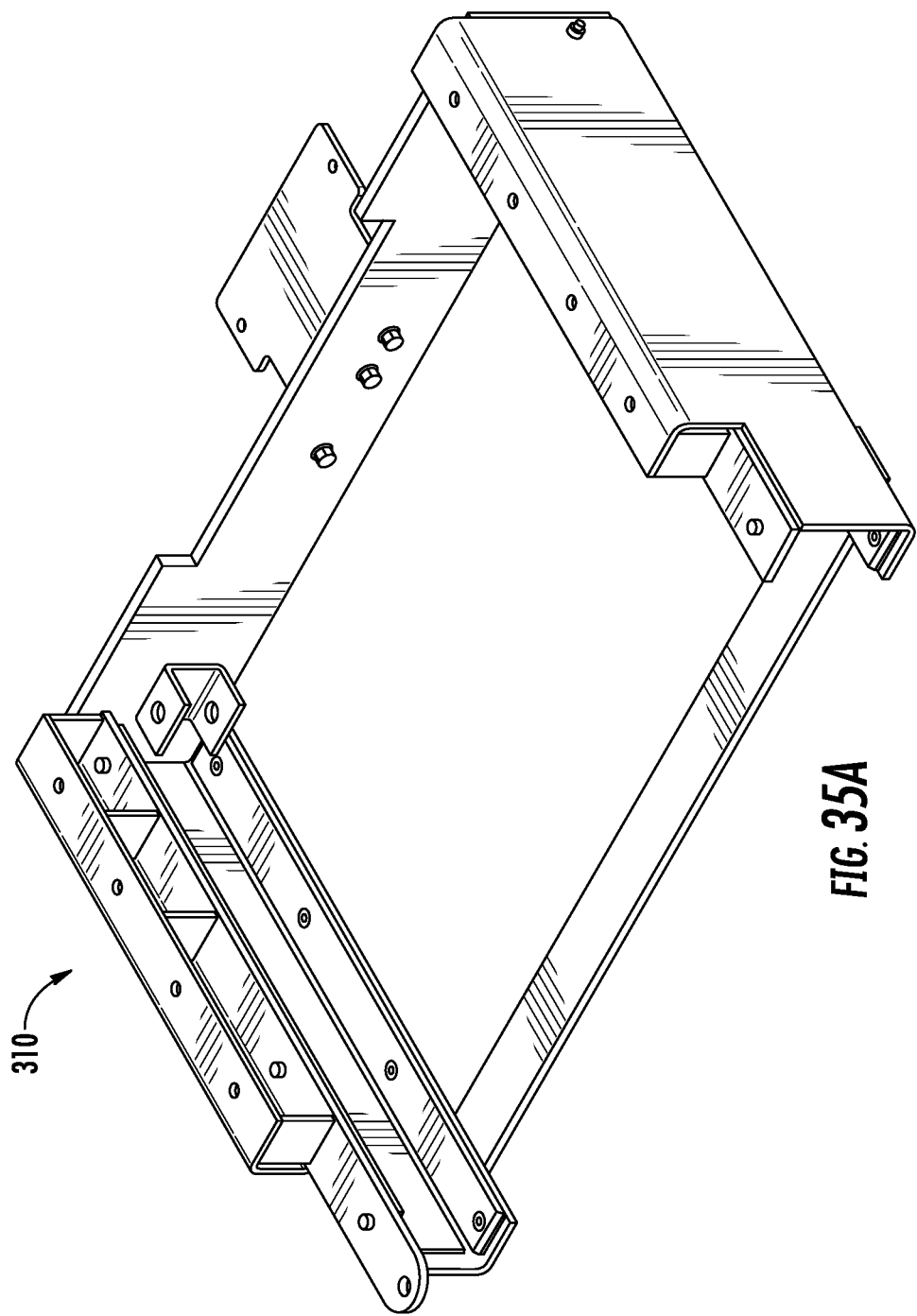
Figure 35B:
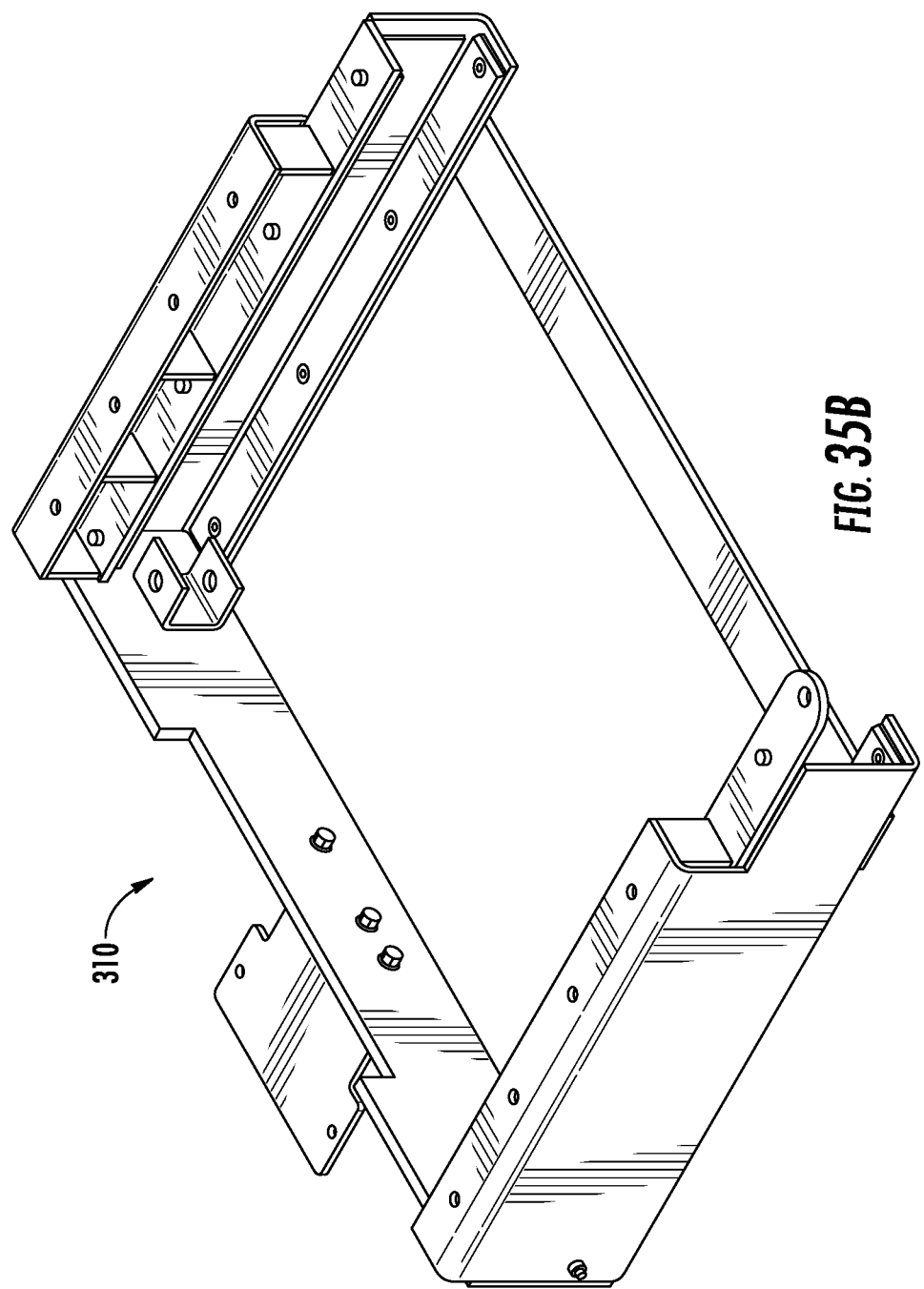
Figure 36:
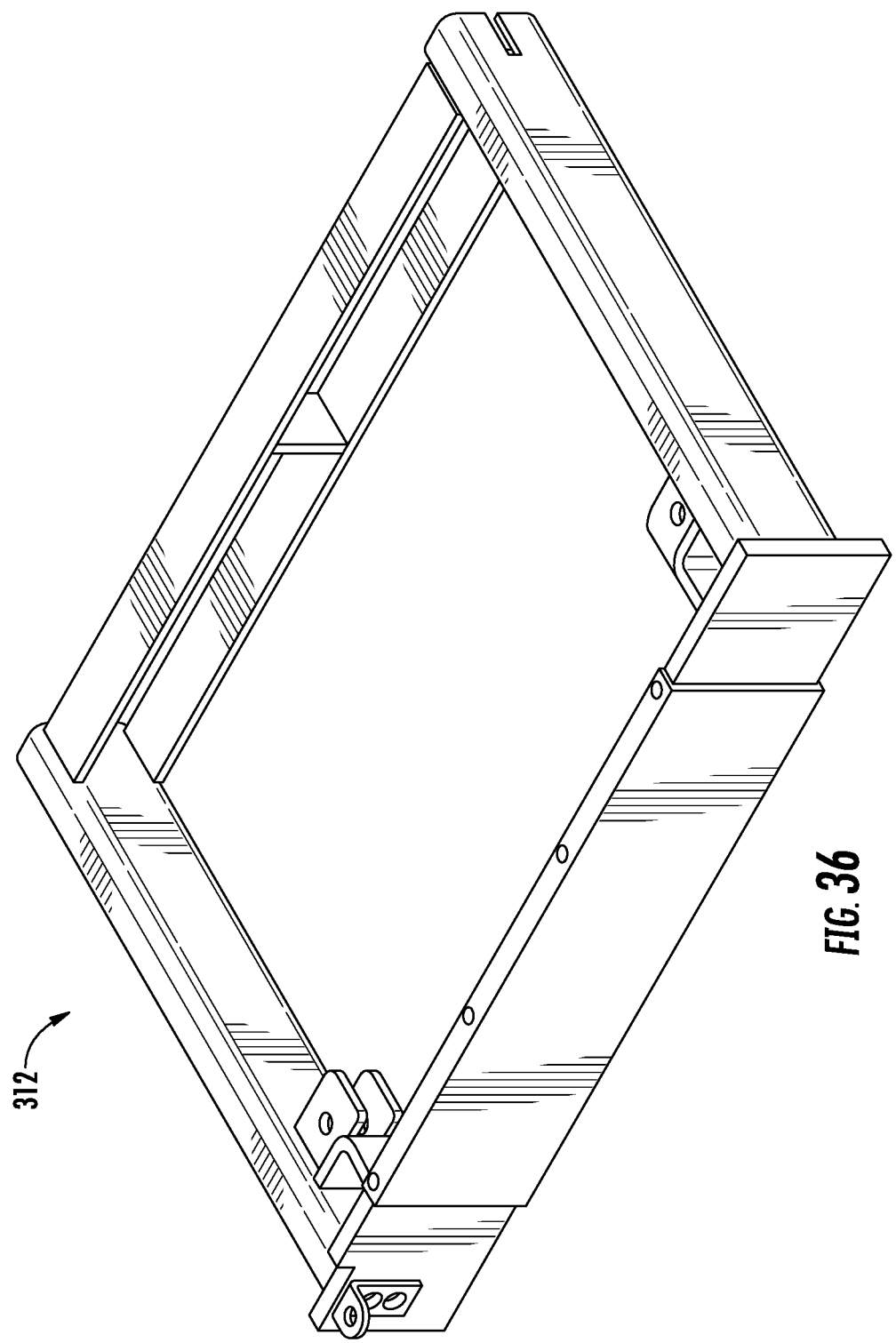
Figure 37:
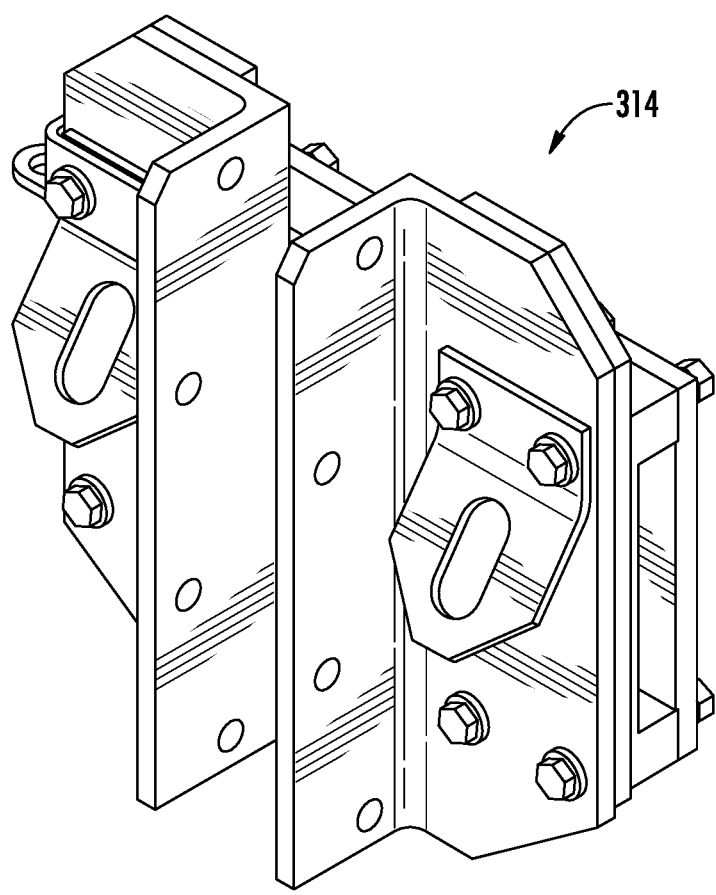
Figure 38:
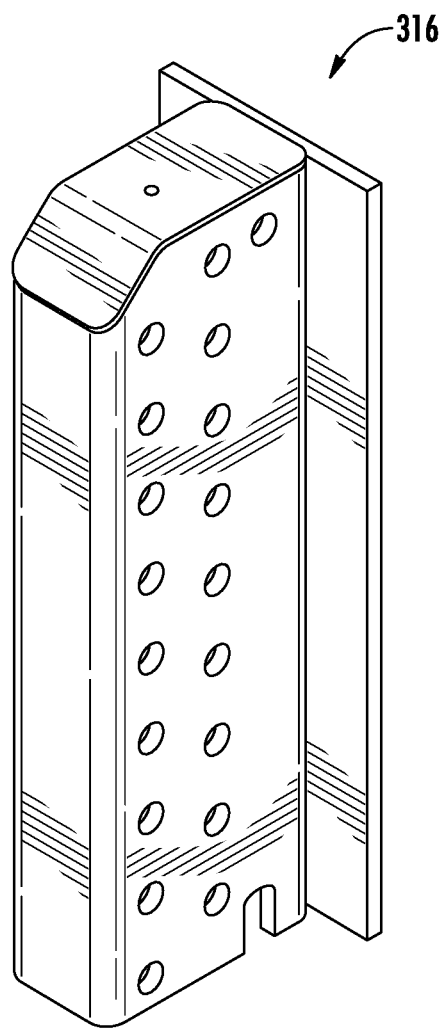
Figure 39:
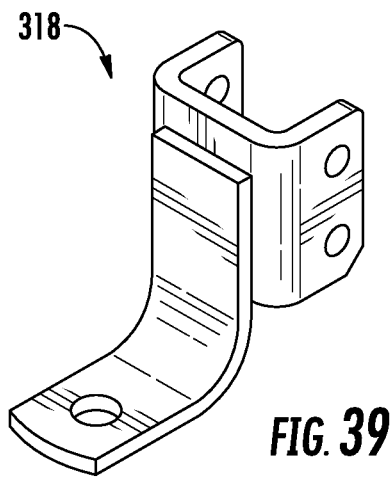
Figure 40:
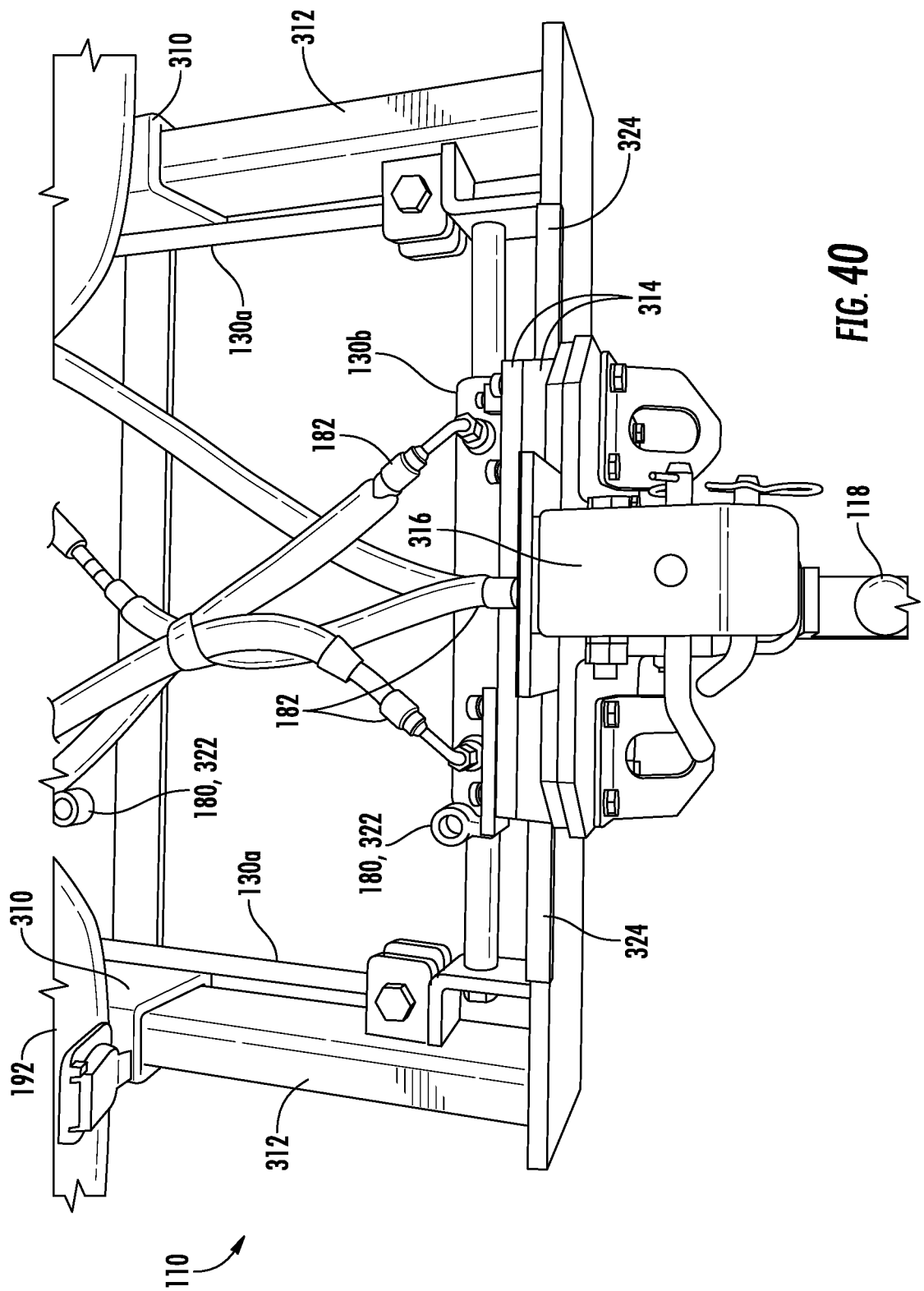
Figure 41:
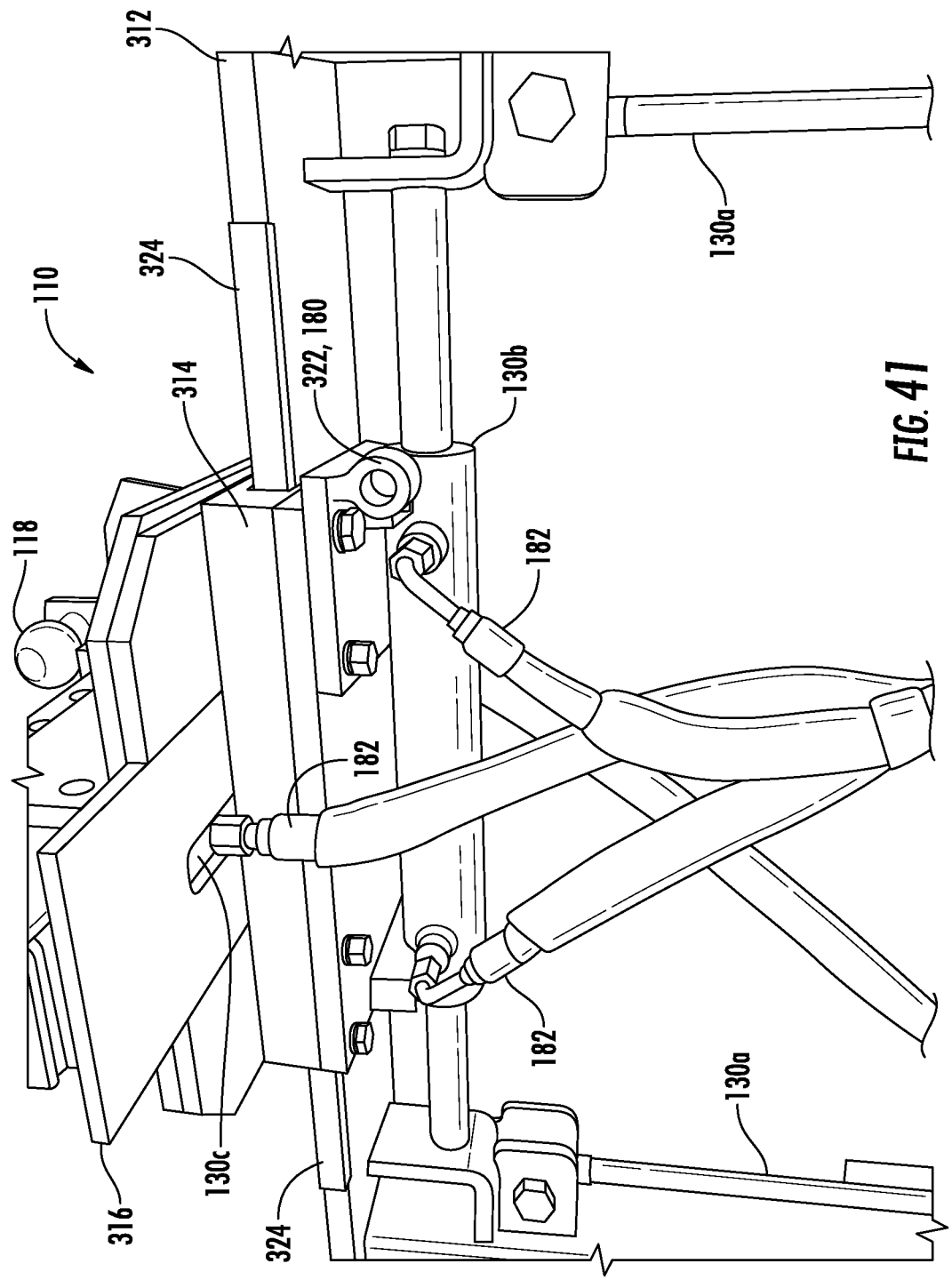
Figure 42:
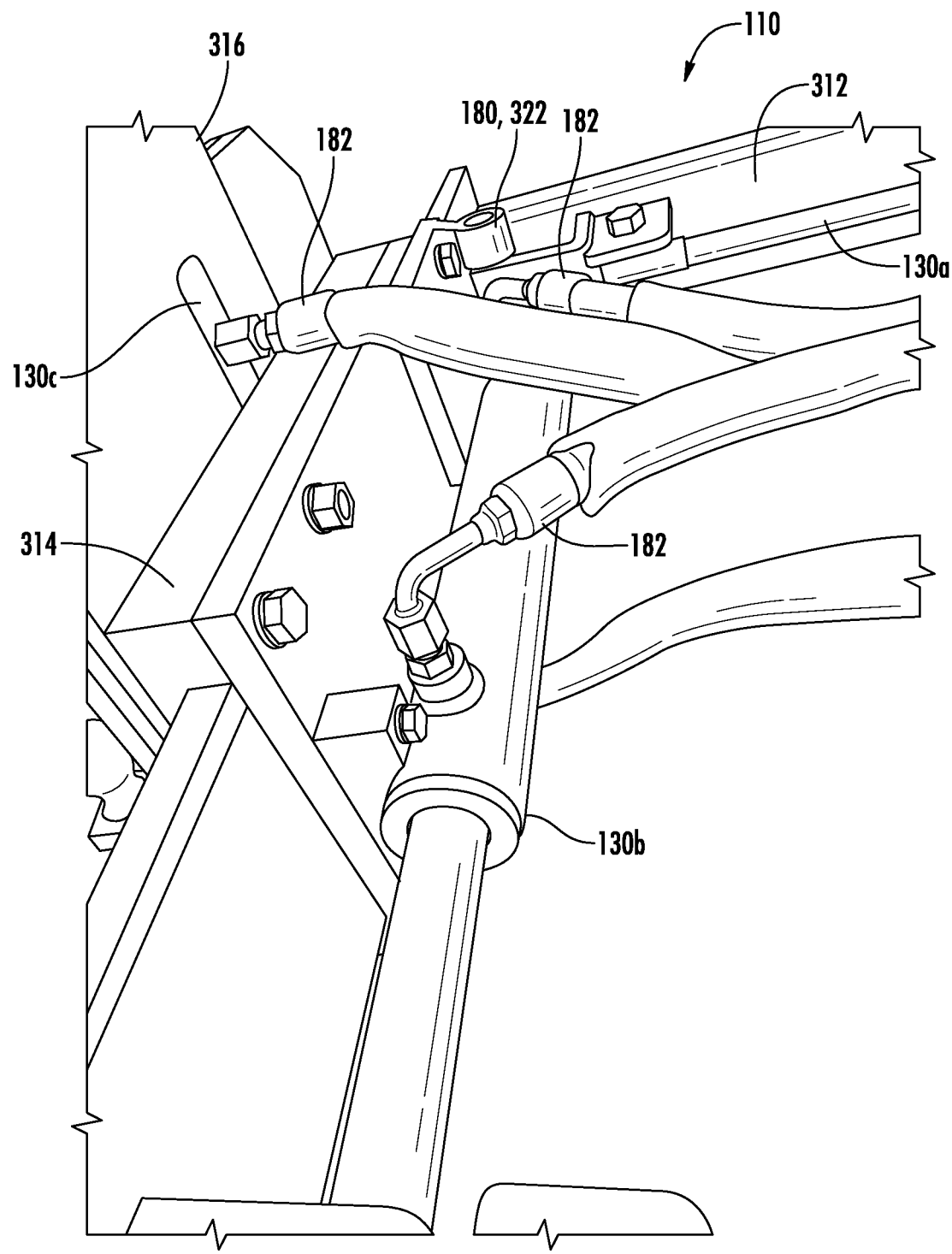
Figure 43:
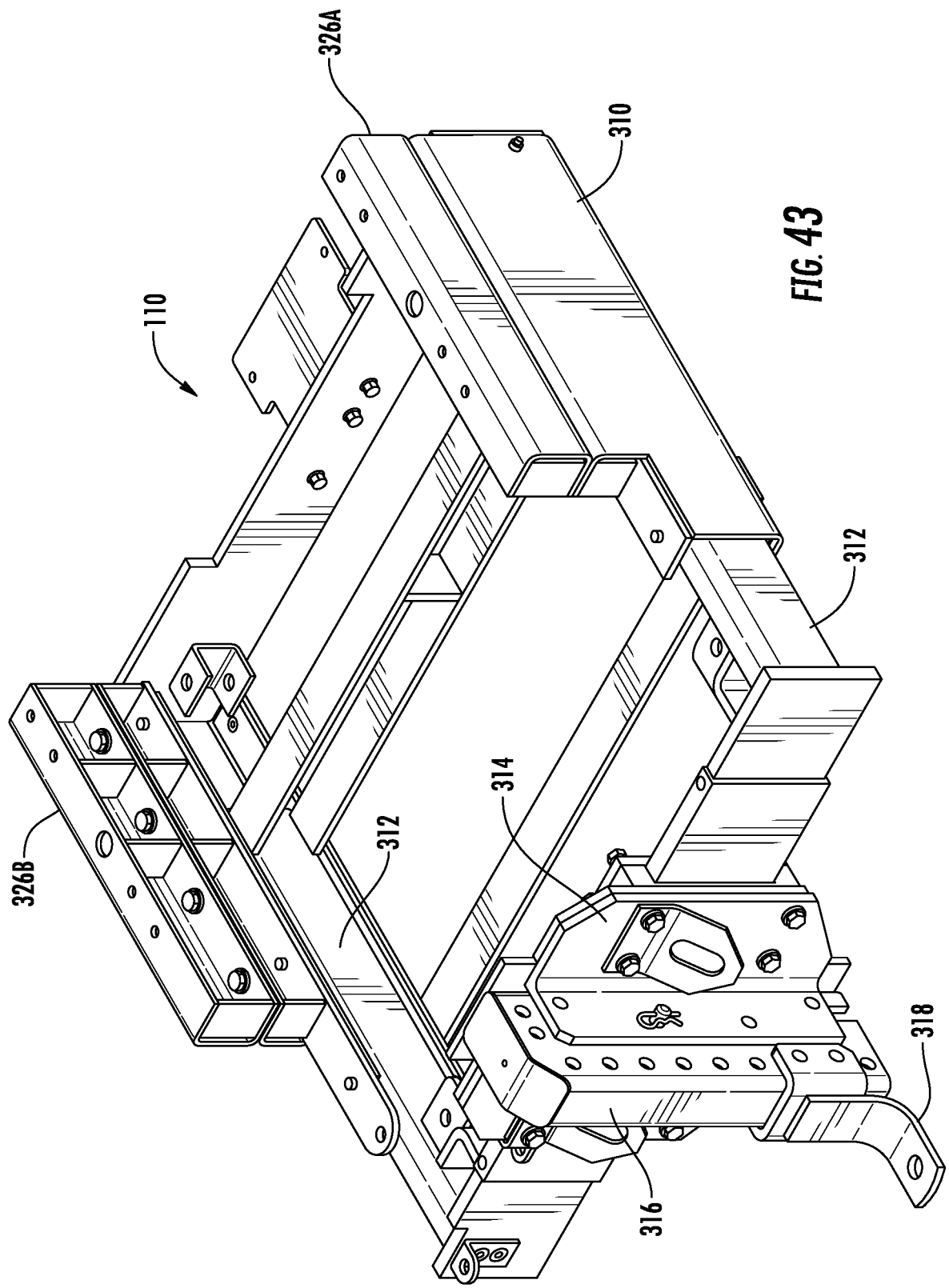
Figure 44A:
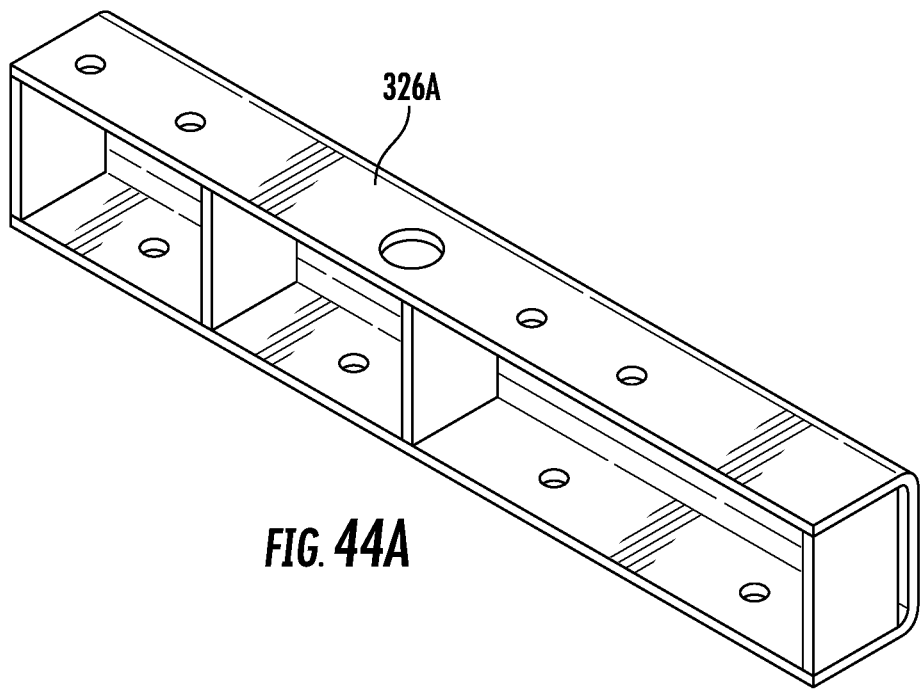
Figure 44B:
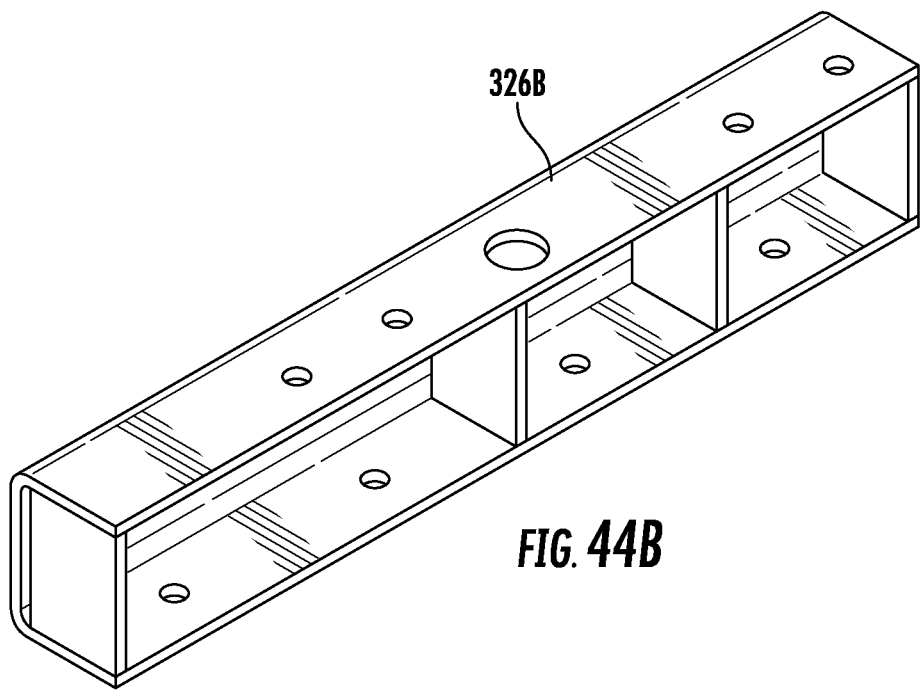

Having thus described the subject matter of the present invention in general terms, reference will now be made to the accompanying drawings, which are not necessarily drawn to scale, and wherein:

FIG. 1 illustrates a block diagram of an example of a trailer hitch system including an actuatable multi-directional trailer hitch in accordance with an embodiment of the invention;

FIG. 2 illustrates a schematic diagram of an example of the six-way directionality of the multi-directional trailer hitch in accordance with an embodiment of the invention;

FIG. 3 through FIG. 12 illustrate the actuatable multi-directional trailer hitch and examples of the implementation, various operating states, and features thereof in accordance with example embodiments of the invention;

FIG. 13 illustrates a flow diagram of an example of a method of using the trailer hitch system including the actuatable multi-directional trailer hitch in accordance with an embodiment of the invention;

FIG. 14 illustrates an example of the multi-directional trailer hitch in the towing position in accordance with an embodiment of the invention;

FIG. 15 and FIG. 16 illustrates examples of various parts and materials that may be used to form the multi-directional trailer hitch in accordance with an embodiment of the invention;

FIG. 17 and FIG. 18 illustrates an example of a longitudinal slide receiver of the multi-directional trailer hitch in accordance with an embodiment of the invention;

FIG. 19 illustrates an example of a longitudinal slide of the multi-directional trailer hitch in accordance with an embodiment of the invention;

FIG. 20 illustrates an orientation of the longitudinal slide to the longitudinal slide receiver of the multi-directional trailer hitch in accordance with an embodiment of the invention;

FIG. 21, FIG. 22, and FIG. 23, illustrate an example of a lateral slide of the multi-directional trailer hitch in accordance with an embodiment of the invention;

FIG. 24 through FIG. 29 illustrate an example of a vertical hitch mount of the multi-directional trailer hitch in accordance with an embodiment of the invention;

FIG. 30 illustrates an example of a ball mount of the multi-directional trailer hitch in accordance with an embodiment of the invention;

FIG. 31 illustrates an example of a longitudinal/lateral pin-off of the multi-directional trailer hitch in accordance with an embodiment of the invention;

FIG. 32 illustrates an example of certain brass members of the multi-directional trailer hitch in accordance with an embodiment of the invention;

FIG. 33 illustrates an example of a safety locking pin in accordance with an example embodiment of the invention;

FIG. 34A through FIG. 42 illustrates additional views of the multi-directional trailer hitch and its components in accordance with example embodiments of the invention;

FIG. 43 illustrates the multi-directional trailer hitch including adapter frame components in accordance with another example embodiment of the invention; and FIG. 44A and FIG. 44B illustrates examples of adapter frame components of FIG. 43 in accordance with an example embodiment of the invention.

DETAILED DESCRIPTION

The subject matter of the present invention now will be described more fully hereinafter with reference to the accompanying drawings, in which some, but not all embodiments of the present invention are shown. Like numbers refer to like elements throughout. The present invention may be embodied in many different forms and should not be construed as limited to the embodiments set forth herein; rather, these embodiments are provided so that this disclosure will satisfy applicable legal requirements. Indeed, many modifications and other embodiments of the present invention set forth herein will come to mind to one skilled in the art to which the present invention pertains having the benefit of the teachings presented in the foregoing descriptions and the associated Drawings. Therefore, it is to be understood that the present invention is not to be limited to the specific embodiments disclosed and that modifications and other embodiments are intended to be included within the scope of the appended claims.

In some embodiments, the present invention may provide a trailer hitch system, actuatable multi-directional trailer hitch, and methods. In some embodiments, the trailer hitch system and multi-directional trailer hitch operate based on hydraulics. Further, the actuatable multi-directional trailer hitch of the trailer hitch system may provide six-way directionality (i.e., in, out, left, right, up, and down) with respect to the vehicle in which it is installed.

In some embodiments, the actuatable multi-directional trailer hitch of the present invention may include an in-out actuation mechanism for providing in-out directionality, a side-to-side actuation mechanism for providing side-to-side directionality, and an up-down actuation mechanism for providing up-down directionality with respect to the vehicle in which it is installed and for easily aligning with and coupling to a trailer.

In some embodiments, the trailer hitch system and actuatable multi-directional trailer hitch of the present invention may provide the capability to move a trailer in multiple directions (independent of the vehicle) in order to gain access to tight locations for loading/unloading cargo. Further, the vertical adjustment capabilities of the multi-directional trailer hitch of the present invention may allow easy leveling of cargo for proper hauling positioning.

In some embodiments, the trailer hitch system and actuatable multi-directional trailer hitch of the present invention may provide safety locking pins that act as safety/transport positioners for the in-out, side-to-side, and up-down actuation mechanisms.

Further, an example method of using the trailer hitch system and actuatable multi-directional trailer hitch of the present invention is provided.

Referring now to FIG. 1 is a block diagram of an example of the trailer hitch system 100 including an actuatable multi-directional trailer hitch 110. Multi-directional trailer hitch 110 may include, for example, an in-out actuation mechanism 112, a side-to-side actuation mechanism 114, and an up-down actuation mechanism 116. In-out actuation mechanism 112, side-to-side actuation mechanism 114, and up-down actuation mechanism 116 may be used to manipulate a trailer hitch ball 118, for example, to provide six-way directionality to trailer hitch ball 118 for easily aligning to a trailer.

In one example, multi-directional trailer hitch 110 may be controlled and driven via hydraulics. For example, trailer hitch system 100 may include a hydraulic pump 120 that is supplied by a hydraulic fluid reservoir 122. Hydraulic pump 120 may drive any number of hydraulic actuators needed to operate multi-directional trailer hitch 110. For example, a hydraulic cylinder 130a may be provided to actuate in-out actuation mechanism 112 of multi-directional trailer hitch 110 to translate trailer hitch ball 118 in an in-out direction 150. Hydraulic cylinder 130a may be controlled via a control valve 132a. A hydraulic cylinder 130b may be provided to actuate side-to-side actuation mechanism 114 of multi-directional trailer hitch 110 to translate trailer hitch ball 118 in a side-to-side direction 152. Hydraulic cylinder 130b may be controlled via a control valve 132b. A hydraulic cylinder 130c may be provided to actuate up-down actuation mechanism 116 of multi-directional trailer hitch 110 to translate trailer hitch ball 118 in an up-down direction 154. Hydraulic cylinder 130c may be controlled via a control valve 132c.

Further, trailer hitch system 100 and multi-directional trailer hitch 110 is not limited to being a hydraulics-based system. In another example, trailer hitch system 100 and multi-directional trailer hitch 110 may be a motor-based system (not shown). In this example, multi-directional trailer hitch 110 may include a motor driven apparatus wherein trailer hitch system 100 and/or multi-directional trailer hitch 110 may include, for example, electric motors, gears, chains, belts, pulleys, and the like.

Referring now to FIG. 2 is an illustration of an example of the six-way directionality of the multi-directional trailer hitch 110. FIG. 2 shows a vehicle 190 that has a vehicle rear portion 192. Multi-directional trailer hitch 110 may be installed with respect to vehicle rear portion 192 of vehicle 190. Vehicle 190 may be, for example, a pickup truck, an SUV, or any type of utility vehicle capable of towing a trailer. Further, the components (see FIG. 1) of trailer hitch system 100 may be installed with respect to vehicle rear portion 192 of vehicle 190 and trailer hitch system 100.

The six-way directionality of multi-directional trailer hitch 110 may include, for example, the in-out direction 150, the side-to-side direction 152, and the up-down direction 154. The six-way directionality being in, out, left, right, up, and down. In one non-limiting example, the full actuatable range (e.g., via hydraulics) of the in-out direction 150 may be in the range of about 14 inches. In a non-limiting example, the full actuatable range of the side-to-side direction 152 may be in the range of about 10 inches (e.g., in the range of about 5 inches either side of center). In one non-limiting example, the full actuatable range of the up-down direction 154 may be in the range of about 10 inches. Further, the actuatable 10 inch-up-down range may be a sliding window within a larger, for example, 24-inch window and wherein the position of the actuatable 10 inch-up-down range within the larger 24-inch window may be selectable.

Referring now to FIG. 3 through FIG. 12 are various illustrations of the trailer hitch system 100 including the actuatable multi-directional trailer hitch 110 and showing examples of the implementation, various operating states, and features thereof.

Figure 3:
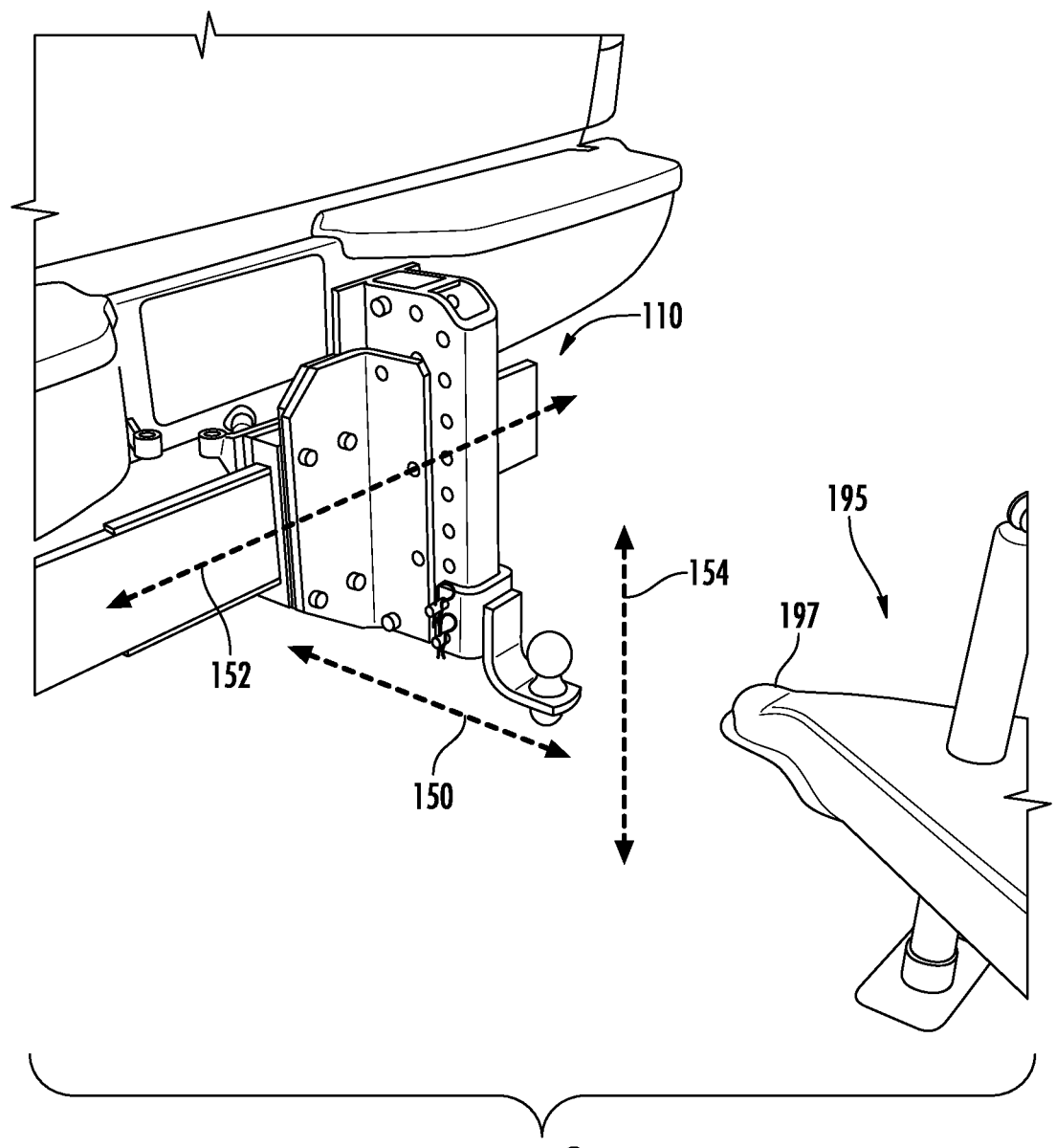

For example, FIG. 3 shows multi-directional trailer hitch 110 set in the "home" position and in close proximity to, for example, a trailer 195 that includes a trailer hitch 197. The "home" position may be, for example, the beginning state of multi-directional trailer hitch 110 when hooking up to a trailer, such as trailer 195. In one example, the "home" position may be multi-directional trailer hitch 110 fully retracted in the in-out direction 150, substantially centered in the side-to-side direction 152, and fully down or low in the up-down direction 154.

Figure 4:
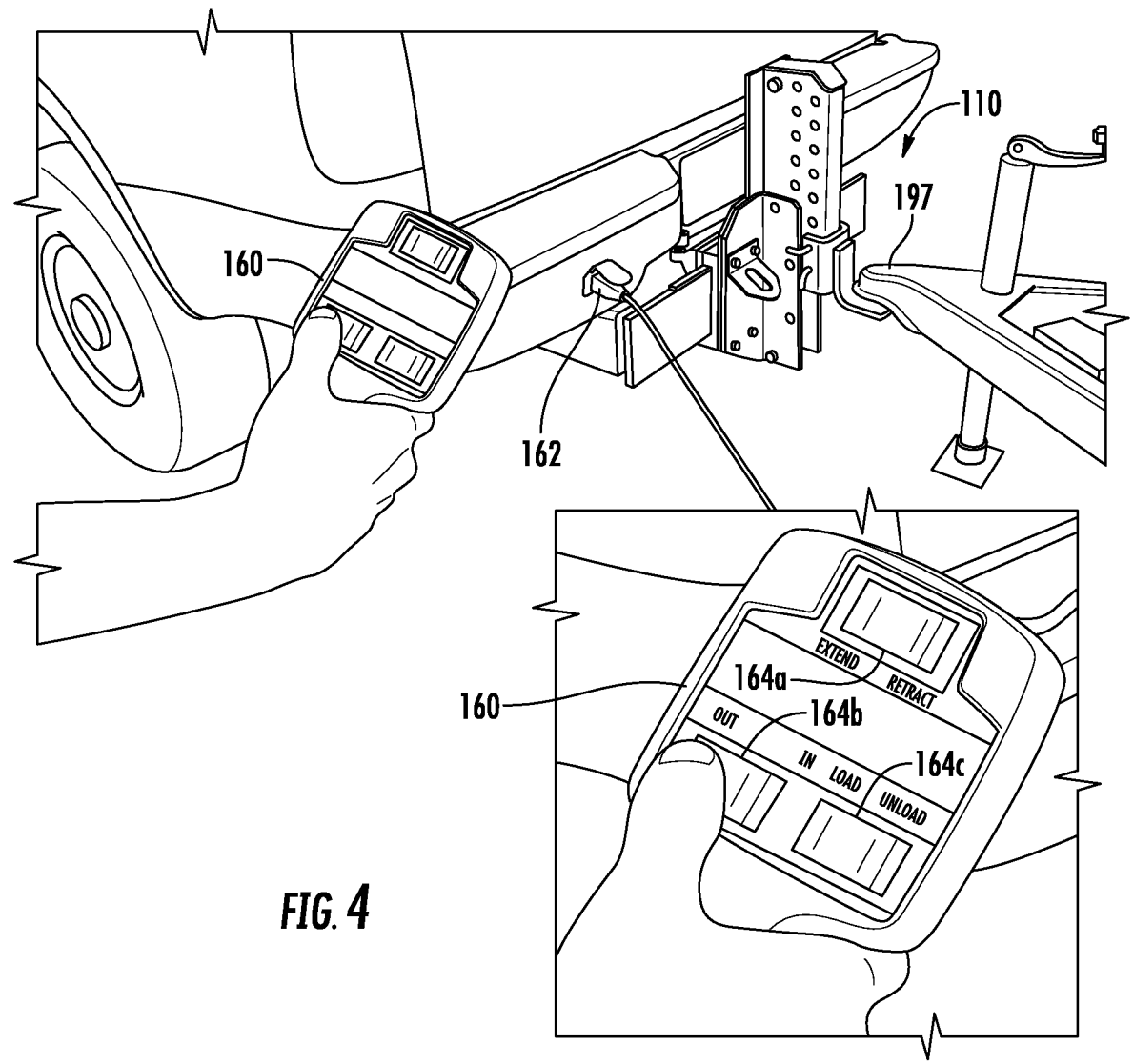

Further, FIG. 4 shows an example of a plug adapter 162 mounted to the vehicle 190 (e.g., in the rear bumper) that is provided to receive a handheld control device 160. In just one non-limiting example, handheld control device 160 may be the Hand Control Cable for 3 Bank BUCHNER Valve (150037). The handheld control device 160 may plug into the plug adapter 162 so that the handheld control device 160 can be removed and stored in the cab of the truck (or a tool box). The handheld control device 160 may have a cord, e.g., about a 5-foot cord, attached. In one embodiment the handheld control device 160 may be wireless. The handheld control device 160 may have one or more switches 164, for example three switches 164: a side-to side switch 164a, an in-and-out switch 164b, and an up-and-down switch 164c (correlating to control valves 132a, 132b, 132c). In another embodiment, one or more switches 164 may be one or more toggle or joystick type switches/controllers.

Figure 5:
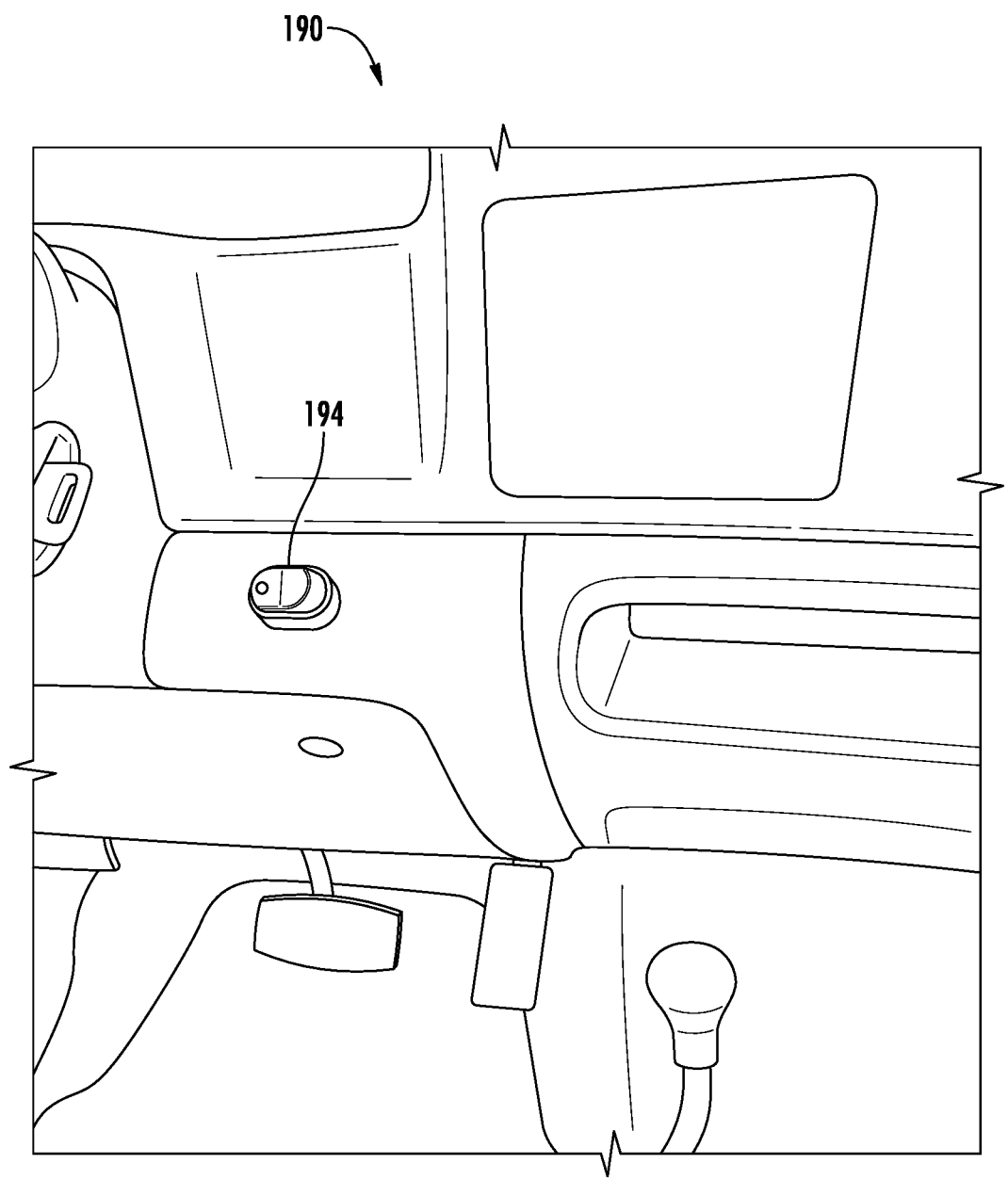

Hydraulic pump 120 of trailer hitch system 100 may be, in one non-limiting example, a hydraulic clutch pump (e.g., DewEze 7 GPM Hydraulic Clutch Pump Kit (700330-7)). The hydraulic clutch pump may be mounted to engage with a serpentine belt of the motor of vehicle 190, wherein the serpentine belt runs the clutch pump. A hydraulic clutch pump is just one example of hydraulic pump 120 that may be used with the trailer hitch system 100. A pump activation switch 194 may be provided in the cab of the vehicle 190. In one example, a pump activation switch 194 may be mounted on the dash of the vehicle 190 as shown in FIG. 5. Pump activation switch 194 may be actuated by a user to turn on the clutch pump.

In this example, using a hydraulic clutch pump, vehicle 190 would be running to run the clutch pump. The clutch pump may be plumbed to the hydraulic fluid reservoir 122. In one non-limiting example, hydraulic fluid reservoir 122 may be a 5-gallon hydraulic reservoir tank #103219 available from Agri-Supply Company. The hydraulic fluid reservoir 122 may be modified, if needed, for vehicle mounting and may be mounted to the vehicle 190, for example under the bed of the vehicle 190 (e.g., behind the cab on the passenger side).

Control valves 132, e.g., control valves 132a, 132b, 132c may be mounted under the bed of vehicle 190 and proximal to (e.g., just above) multi-directional trailer hitch 110 (i.e., the six-way apparatus) and towards vehicle rear portion 192 of vehicle 190. In one non-limiting example, control valves 132a, 132b, 132c may be the 3-Bank BUCHNER valve (725208). The control valves 132a, 132b, 132c may receive hydraulic fluid from the hydraulic fluid reservoir 122. The control valves 132a, 132b, 132c may be individually controlled by electric solenoids (not shown). Again, handheld control device 160 may be plugged into plug adapter 162. The three switches 164 (e.g., side-to side switch 164a, in-and-out switch 164b, and up-and-down switch 164c) of handheld control device 160 power the hydraulic cylinders (e.g., hydraulic cylinders 130a, 130b, 130c) for the six-way directionality.

Figure 6:
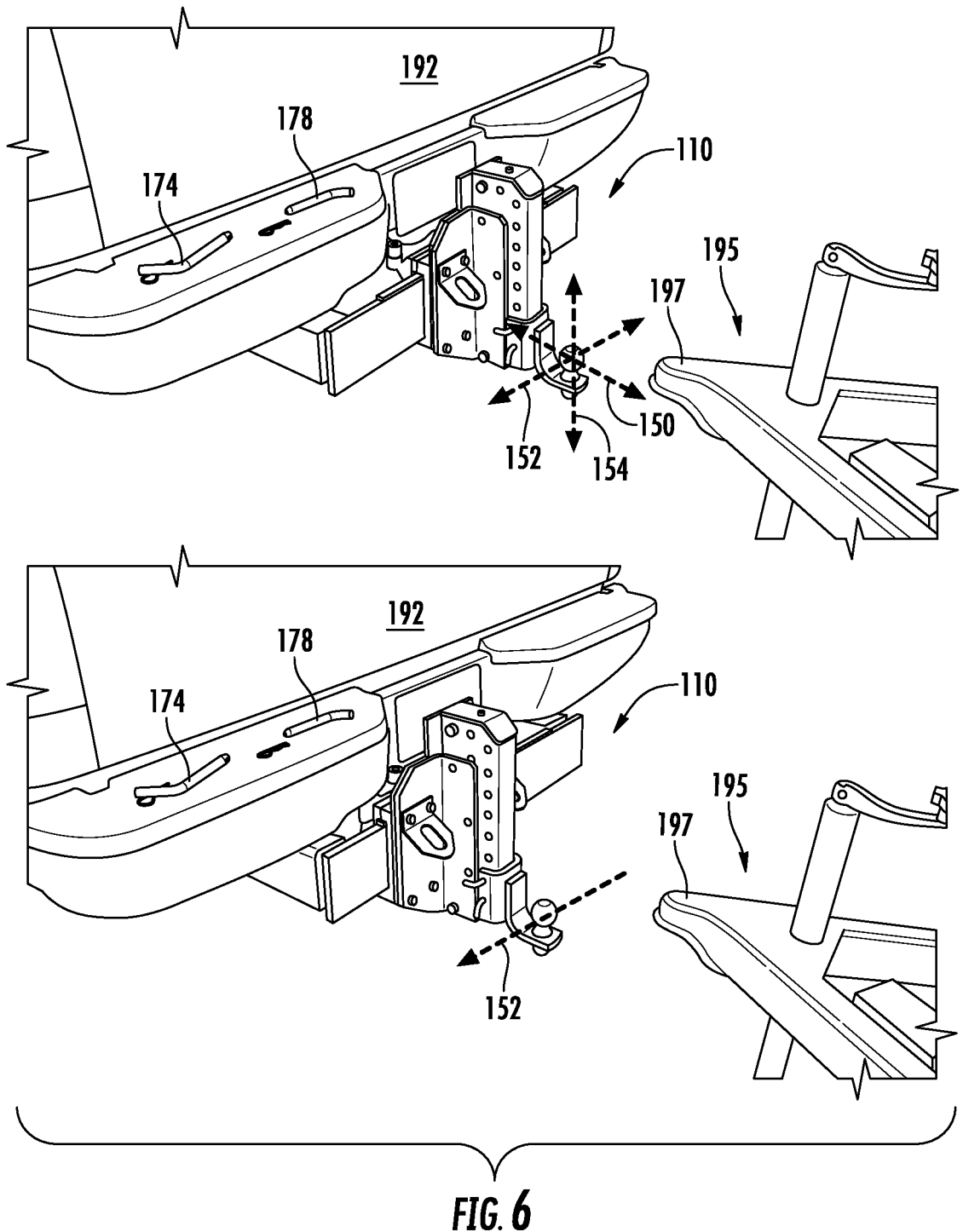

One view of FIG. 6 shows multi-directional trailer hitch 110 in the "home" position and therefore substantially centered in the side-to-side direction 152. By contrast, another view of FIG. 6 shows multi-directional trailer hitch 110 shifted substantially left in the side-to-side direction 152.

Figure 7:
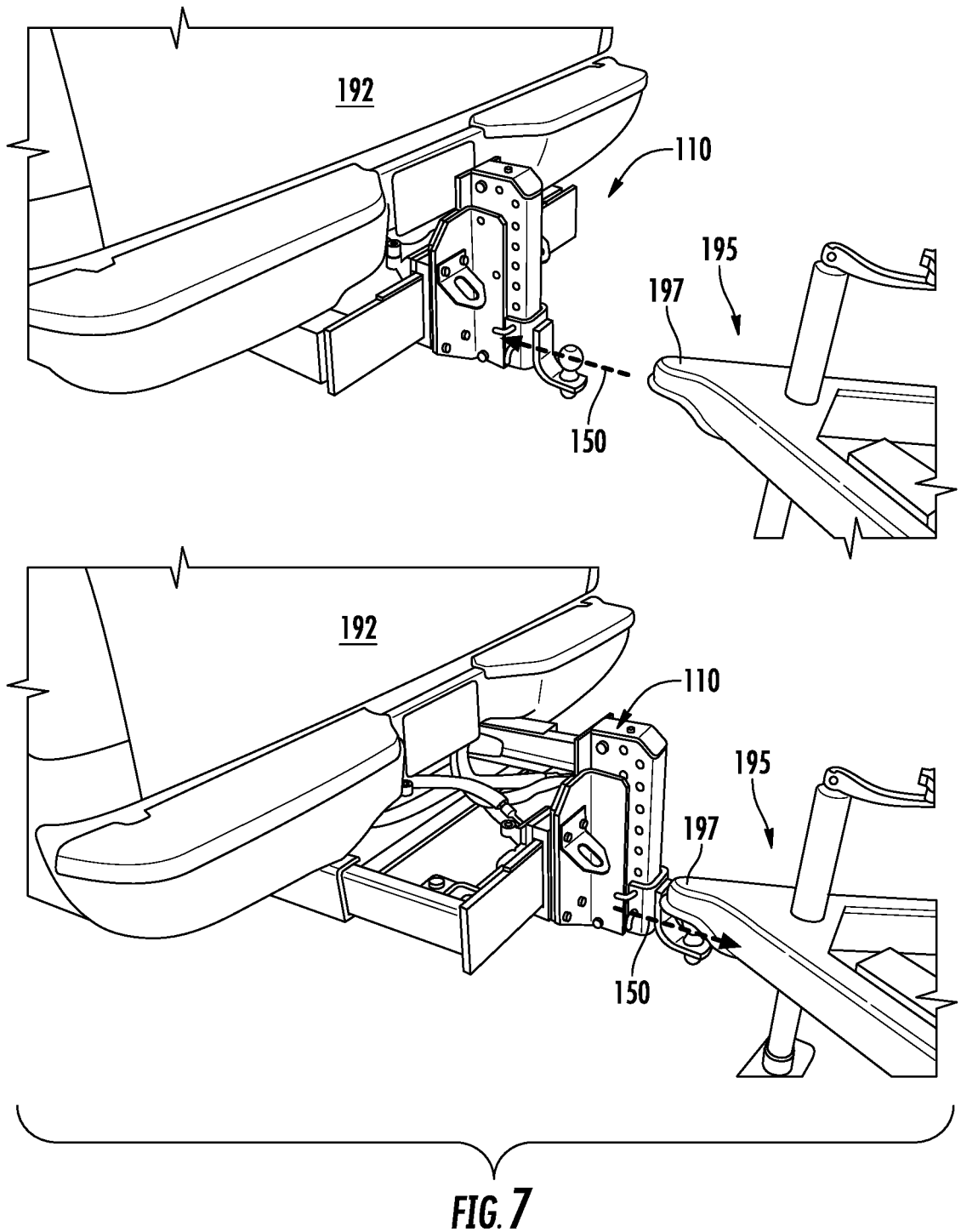

One view of FIG. 7 shows multi-directional trailer hitch 110 in the "home" position and therefore fully retracted in the in-out direction 150 (i.e., fully toward vehicle 190). By contrast, another view of FIG. 7 shows multi-directional trailer hitch 110 extended in the in-out direction 150 (i.e., away from vehicle 190).

Figure 8:
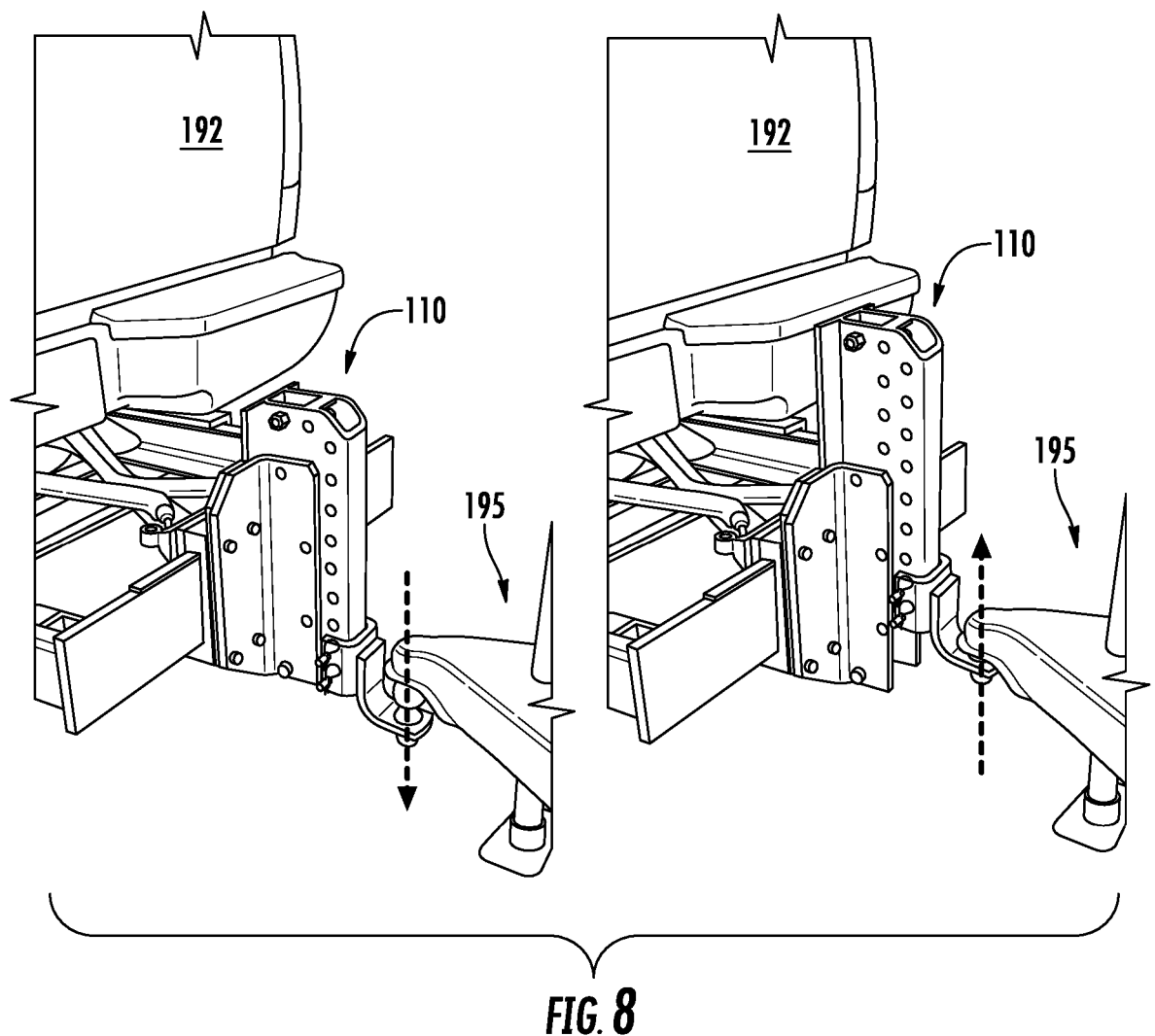

One view of FIG. 8 shows multi-directional trailer hitch 110 fully down or low in the up-down direction 154. By contrast, another view of FIG. 8 shows multi-directional trailer hitch 110 up or high in the up-down direction 154.

Figure 9:
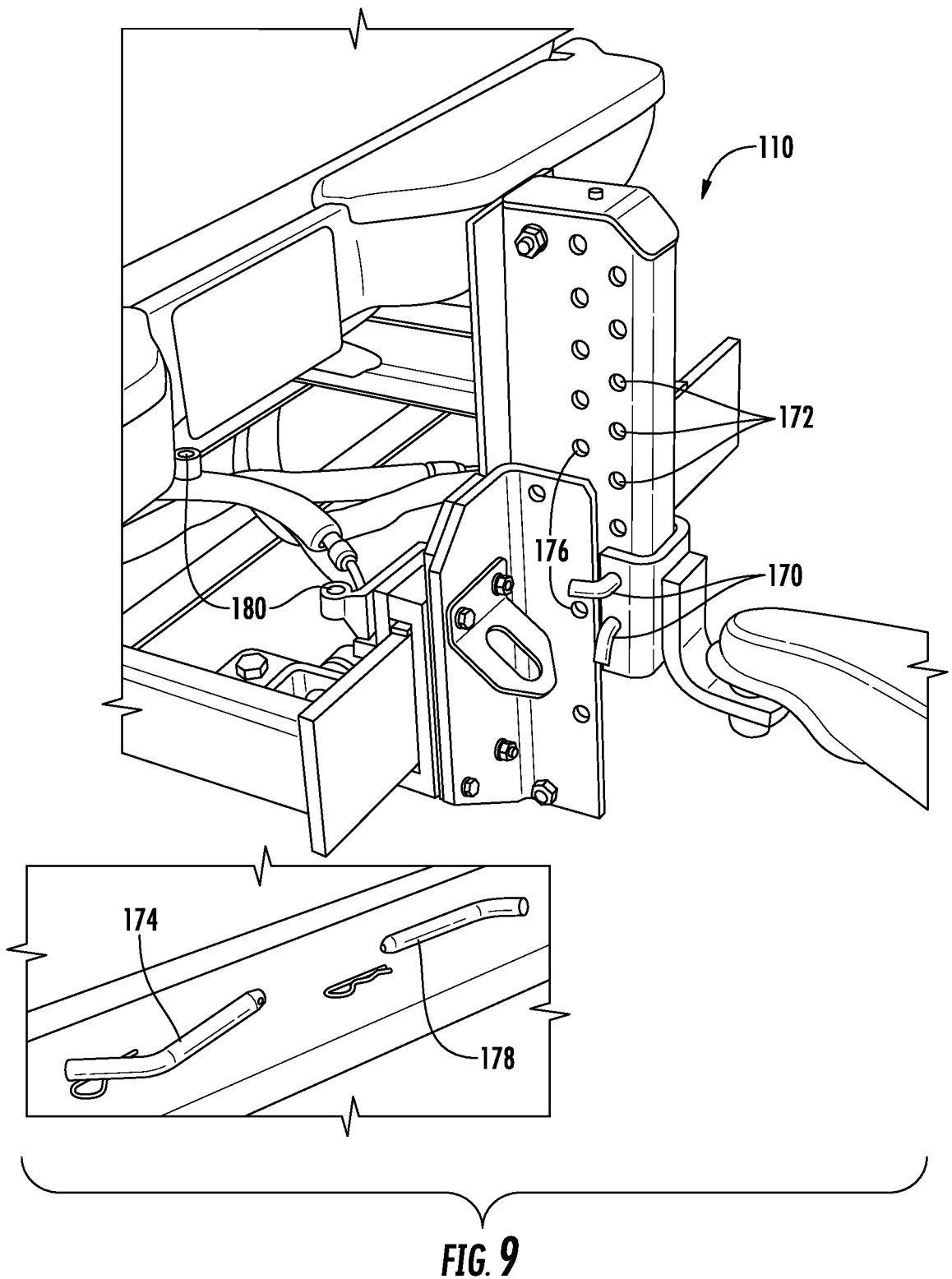

FIG. 9 shows an example of an up-and-down pin and hole system that may include pins 170 and holes 172 on the vertical hitch mount member that supports the up-down range of multi-directional trailer hitch 110. Again, an actuatable up-down range, e.g., 10 inch, may be a sliding window within a larger window, e.g., 24-inch, and wherein the position of the actuatable smaller, e.g., 10 inch, up-down range within the larger, e.g., 24-inch, window may be selectable via pins 170 and holes 172. Namely, a vertical line of holes 172 may be provided and with the holes spaced about 2 inches on center. Using two pins 170, the ball mount may be mounted to any pair of holes 172 along the line.

Figure 10:
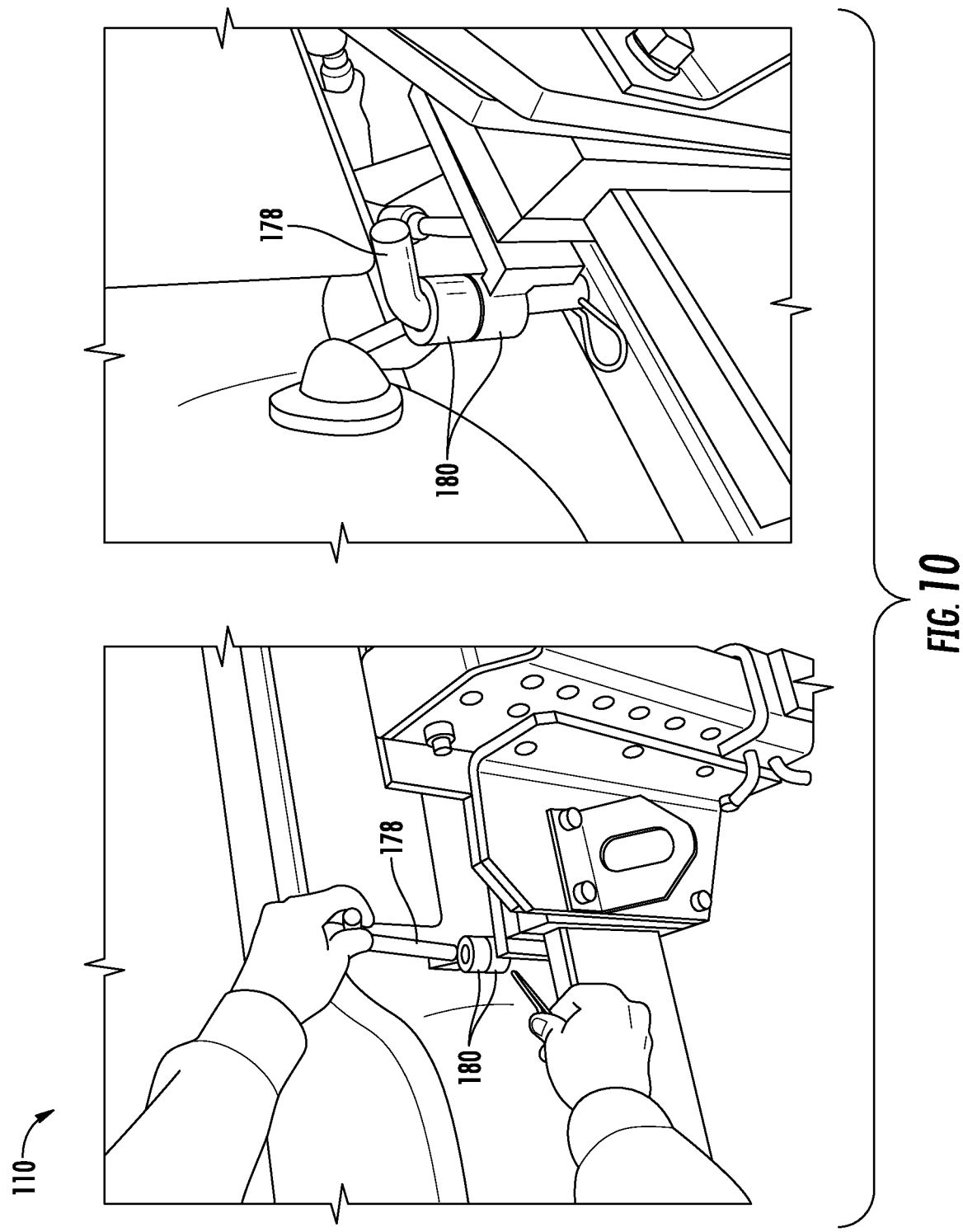
Figure 11:
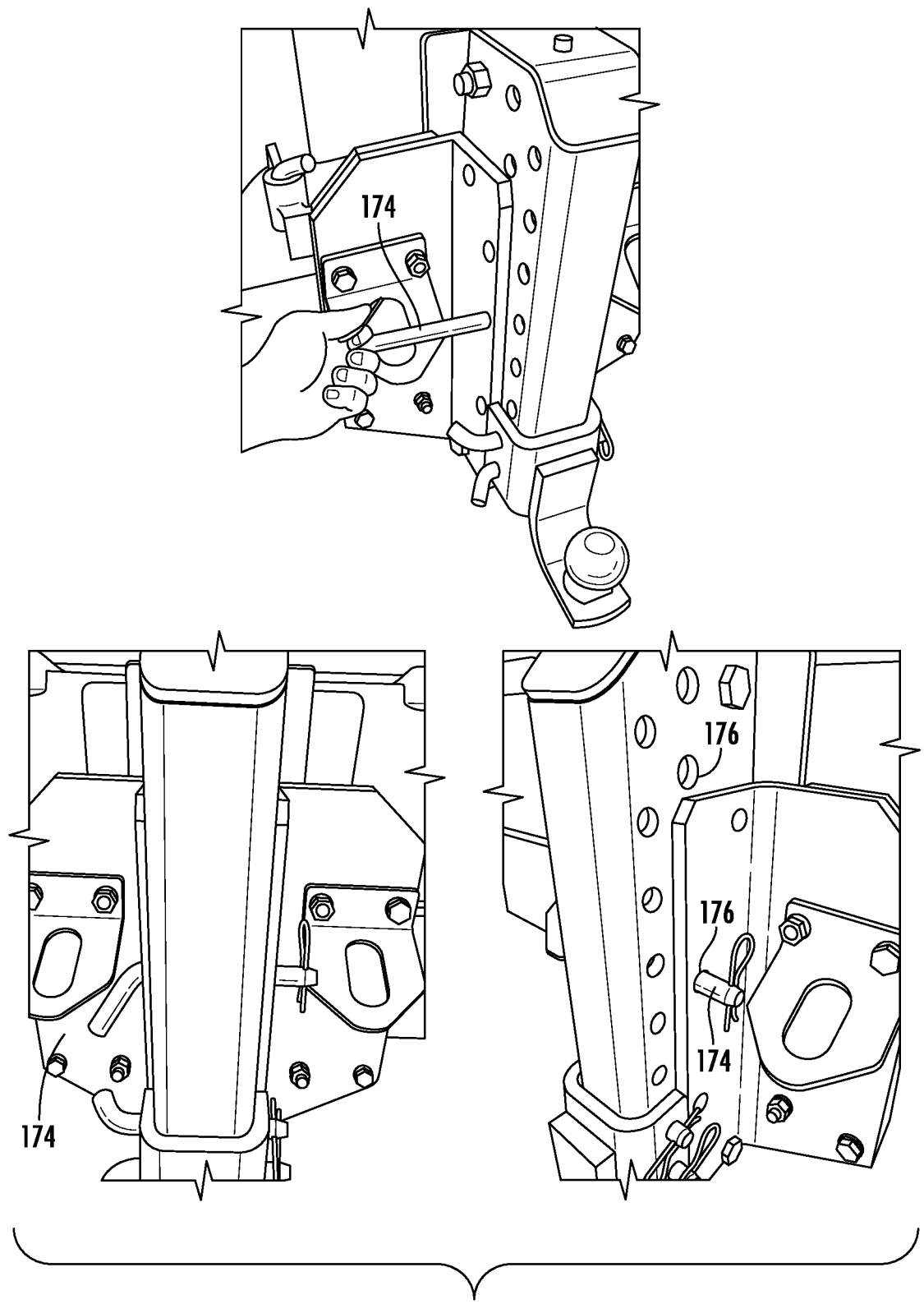

Further, FIG. 9, FIG. 10, and FIG. 11 show an example of a safety locking pin and hole system. For example, multi-directional trailer hitch 110 may include an up-down safety locking pin 174 for fitting into an up-down safety locking hole 176 in the vertical hitch mount member and a safety locking pin 178 for fitting into a pair of safety locking pin receivers 180 (322). When in the towing position, up-down safety locking pin 174 is inserted into an up-down safety locking hole 176 for taking the load off the hydraulics associated with up-down actuation mechanism 116 (i.e., the hydraulics associated with the up-down direction 154). Similarly, when in the towing position, the pair of safety locking pin receivers 180 (322) are brought into alignment, then safety locking pin 178 may be inserted into the safety locking pin receivers 180 (322) for taking the load off the hydraulics associated with the in-and-out actuation mechanism 112 and the side-to-side actuation mechanism 178 114 (i.e., the hydraulics associated with the in-and-out direction 150 and the side-to-side direction 152). FIG. 9 shows up-down safety locking pin 174 and safety locking pin 178 when not installed. FIG. 10 shows an example process of installing safety locking pin 178. FIG. 11 shows an example process of installing up-down safety locking pin 174. Up-down safety locking pin 174 and safety locking pin 178 may act as transport positioners for in-out actuation mechanism 112, side-to-side actuation mechanism 114, and up-down actuation mechanism 116.

Figure 12:
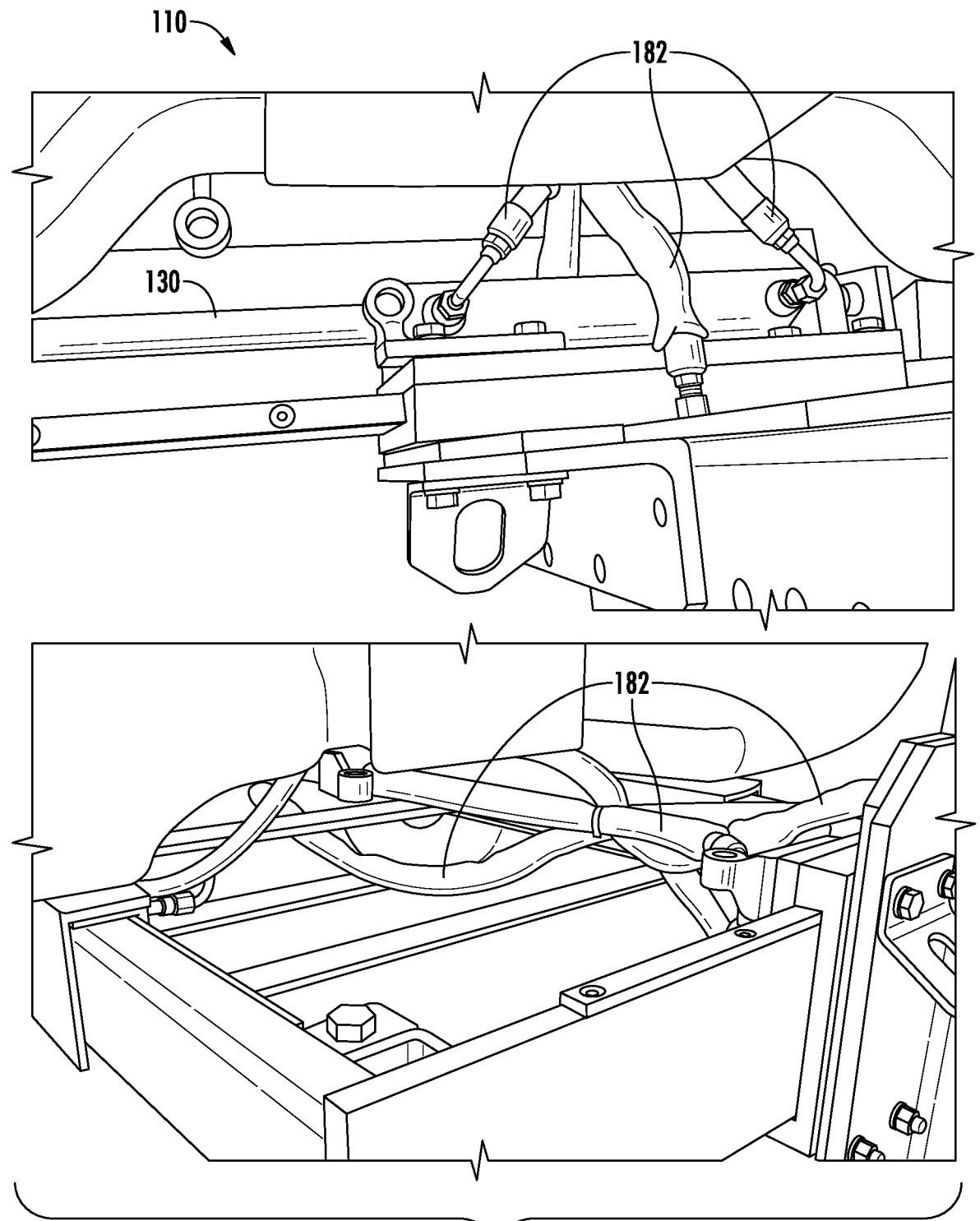

Further, FIG. 12 shows an example of certain hydraulics components (e.g., hydraulic lines and couplers 182) of trailer hitch system 100 and/or multi-directional trailer hitch 110. FIG. 12 shows an example of a hydraulic cylinder 130.

Referring now again to FIG. 1 through FIG. 12, the longitudinal (in-and-out slide) motion (e.g., hydraulic cylinder 130a and in-out actuation mechanism 112) may be powered by the hydraulic cylinder 130a that pushes trailer hitch ball 118 out (or retracts in), for example in the range of about 14 inches. The lateral (side-to-side) motion (e.g., hydraulic cylinder 130b and side-to-side actuation mechanism 114) may be powered by the hydraulic cylinder 130b that moves trailer hitch ball 118 side-to-side for example in the range of about 10 inches (e.g., in the range of about 5 inches each way from center). The vertical (up-and-down) motion (e.g., hydraulic cylinder 130c and up-down actuation mechanism 116) may be powered by the hydraulic cylinder 130c that carries trailer hitch ball 118 for example in the range of about 10 inches. The trailer hitch ball 118 itself may be adjusted to allow, for example, in the range of about 24 inches of up-and-down travel by utilizing the up-and-down pin and hole system that includes pins 170 and holes 172. The example range of movement of trailer hitch ball 118 in the in-out, side-to-side, and up-down direction are examples only, and other distance less than or greater than those examples are contemplated herein.

In another example, rather than using a hydraulic clutch pump, a self-contained hydraulic power unit may be used that may run off of the battery power of the vehicle (or other separate power source). This configuration eliminates the need for the clutch pump and may further eliminate the need for the reservoir tank. The use of self-contained hydraulic power unit may be less costly and simpler to install than using the clutch pump.

Examples of certain parts and/or components of trailer hitch system 100 and/or multi-directional trailer hitch 110 may include, but are not limited to, the following.

Hydraulic Cylinders 130a, 130b, 130c
  (1) Surplus Center 1.5×10×1 DA HYD CYL Pinhole (9-7706-10);
  (1) Surplus Center 2×10×1.25 DA Double Rod HYD CYL (9-6846); and
  (2) Surplus Center 1.5×14×0.75 DA HYD CYL (9-4410-14).
Hydraulic Fluid Reservoir Tank 122
  (1) 5-gallon hydraulic reservoir tank #103219 (available from Agri-Supply Company).
Hydraulic Power System (Hydraulic Pump 120, control valves 132a, 132b, 132c and Handheld Control Device 160
  (1) DewEze 7 GPM Hydraulic Clutch Pump Kit (700330-7) *This Clutch Pump is Specific to a 7.3 L Diesel;
  (1) 3 Bank BUCHNER valve (725208); and
  (1) Hand Control Cable for 3 Bank BUCHNER Valve (150037).

Various hoses, fittings, and filters that may vary depending on the type of vehicle and/or any specific plumbing requirements.

FIG. 13 illustrates a flow diagram of an example of a method 200 of using the trailer hitch system 100 including the actuatable multi-directional trailer hitch 110. Method 200 may include, but is not limited to, the following steps. The order of the steps below is just one non-limiting example of the order in which the steps may be conduct, the steps may be performed in a different order.

At a step 210, the trailer hitch system 100 including the actuatable multi-directional trailer hitch 110 is provided in a vehicle suitable for towing (e.g., vehicle 190 shown in FIG. 2).

At a step 215, a user positions the vehicle in close proximity to an item to be towed, e.g., trailer 195, to be hooked up and towed. For example, the user may position vehicle 190 in close proximity to the trailer 195 to within the range of travel of the six-way directionality of the actuatable multi-directional trailer hitch 110, as shown, for example, in FIG. 6. More particularly, the user may position vehicle 190 in close proximity to the trailer 195 to within the range of travel of in-out actuation mechanism 112, side-to-side actuation mechanism 114, and/or up-down actuation mechanism 116 of trailer hitch system 100.

At a step 220, the user activates trailer hitch system 100. For example, the user may activate the trailer hitch system 100 by starting the vehicle 190 in which it is installed (e.g., by starting vehicle 190). Next, the user may activate the hydraulic pump 120. For example, the user may turn on the pump activation switch 194 (see FIG. 5), which turns on the hydraulic pump 120 and sends hydraulic fluid from the hydraulic fluid reservoir 122 to one or more valve bodies (e.g., to control valves 132a, 132b, 132c). In an example in which a self-contained hydraulic power unit is used instead of a hydraulic clutch pump the user may not need to start the vehicle 190 to activate the trailer hitch system 100, and rather may rely on the battery of the vehicle 190 to activate and operate the trailer hitch system 100.

At a step 225, the user may the handheld control device 160 into plug adaptor 162 at the bumper of vehicle 190 (see FIG. 4). The handheld control device 160 may have three switches 164: a side-to-side 164a, an in-and-out 164b, and an up-and-down 164c switch (correlating to control valves 132a, 132b, 132c) for controlling the six-way directionality of the actuatable multi-directional trailer hitch 110. Alternatively, in the case of a wireless handheld control device 160, the user would not need to plug the handheld control device 160 into the plug adaptor 162. Further, in alternative embodiment handheld control device 160 may have another mechanism, other than switches, for controlling the six-way directionality of the actuatable multi-directional trailer hitch 110. For example, the handheld control device 160 may include a joystick or other any suitable mechanism for controlling the six-way directionality.

At a step 230, the user may remove any safety locking pins that act as safety/transport positioners for the in-out, side-to-side, and/or up-down actuation mechanisms. For example, and referring now again to FIG. 9, FIG. 10, and FIG. 11, the user may remove up-down safety locking pin 174 and safety locking pin 178 that act as transport positioners for in-out actuation mechanism 112, side-to-side actuation mechanism 114, and up-down actuation mechanism 116. In one example, safety locking pin 178 may be used to lock the side-to-side and in-out movement of the multi-directional trailer hitch 110, and up-down safety locking pin 174 may be used to lock the up-down movement of the multi-directional trailer hitch 110.

At a step 235, the user may use the handheld control device 160 to operate the actuatable multi-directional trailer hitch 110 to the desired position for coupling a trailer hitch 197 of the trailer 195 to vehicle 190 (see FIG. 3 through FIG. 8). For example, the three switches 164 (e.g., side-to side switch 164a, in-and-out switch 164b, and up-and-down switch 164c) of the handheld control device 160 may be used to open/close control valves 132a, 132b, 132c that allow fluid to the respective hydraulic cylinders 130a, 130b, 130c. Accordingly, the switches 164 of the handheld control device 160 may be used to operate the six-way directionality (i.e., in, out, left, right, up, and down) of multi-directional trailer hitch 110 to the desired position for coupling the trailer 195 to vehicle 190. Namely, to operate in-out actuation mechanism 112, side-to-side actuation mechanism 114, and up-down actuation mechanism 116 of multi-directional trailer hitch 110. Again, handheld control device 160 may have another mechanism, other than switches, for controlling the six-way directionality of the actuatable multi-directional trailer hitch 110, e.g., a joystick or other any suitable mechanism.

At a step 240, once coupled, the multi-directional trailer hitch 110 may be translated to the towing position and any safety locking pins applied. For example, in-out actuation mechanism 112 may be set fully inward toward vehicle 190, side-to-side actuation mechanism 114 may be set to about the center position, and up-down actuation mechanism 116 may be set to a safe and/or best leveling height depending on the characteristics of vehicle 190, the trailer 195, and/or the cargo, as shown, for example, in FIG. 14. Then, the user may reinstall up-down safety locking pin 174 and safety locking pin 178 (see FIG. 9, FIG. 10, and FIG. 11) that act as transport positioners for in-out actuation mechanism 112, side-to-side actuation mechanism 114, and up-down actuation mechanism 116.

At a step 245, the user may unplug the handheld control device 160 from the plug adaptor 162 at the bumper of vehicle 190 (if not using a wireless control device 160), and deactivates trailer hitch system 100 by, for example, turning off the pump activation switch 194 (see FIG. 5).

In summary and referring still to FIG. 1 through FIG. 14, trailer hitch system 100 includes the actuatable multi-directional trailer hitch 110, which is, for example, a six-way-directional trailer hitch for personal and commercial light to medium duty vehicles. As described in FIG. 1 and FIG. 2, multi-directional trailer hitch 110 may be a hydraulically powered hitch that can be mounted to a vehicle with proper modifications and adaptions specific to various vehicle models. Accordingly, multi-directional trailer hitch 110 may be suitable for any vehicle equipped with a hydraulic powerplant, such as a hydraulic pump, reservoir tank, and valve body or for any vehicle with an electric hydraulic self-contained unit that can be mounted at various locations specific to the multi-directional trailer hitch 110 to be installed.

Trailer hitch system 100 and multi-directional trailer hitch 110 provide functionality not found in conventional trailer hitches. For example, multi-directional trailer hitch 110 allows trailer hitch ball 118 to travel in and out (longitudinal) (e.g., for example about 14 inches), side to side (lateral) (e.g., for example about 10 inches), and up and down (vertical) (e.g., for example about 10 inches) with various pin positions that allow the up and down (vertical) travel to cover a larger range in total (e.g., for example about 24 inches). Multi-directional trailer hitch 110 runs on hydraulic power in all directions allowing a user to hook-up to a trailer without the need to reposition the vehicle multiple times to get in an exact location and/or without the need of another person to guide. Multi-directional trailer hitch 110 may eliminate the need of using a trailer jack. Further, multi-directional trailer hitch 110 provides the capability to move a trailer in multiple directions (independent of the vehicle) in order to gain access to tight locations for loading/unloading cargo. The vertical adjustment capabilities of multi-directional trailer hitch 110 allow easy leveling of cargo for proper hauling positioning.

Multi-directional trailer hitch 110 may be formed of welded steel allowing it to handle any load that is within range of the capacity rating of the towing vehicle. Multi-directional trailer hitch 110 may be a bolt-on apparatus that may require some vehicle modifications for proper adaptation.

Referring now to FIG. 15 and FIG. 16 illustrates an example of various parts and materials that may be used to form multi-directional trailer hitch 110. For example, multi-directional trailer hitch 110 may include a longitudinal slide receiver 310, a longitudinal slide 312, a lateral slide 314, a vertical hitch mount 316, a ball mount 318, vertical cylinder bolt spacers 320 (not shown), a longitudinal/lateral pin-off 322 (180), and certain members 324, which in one example may be brass, and in other example may be made of Teflon or other suitable material.

Referring now to FIG. 17 and FIG. 18 illustrates an example of longitudinal slide receiver 310 of multi-directional trailer hitch 110. Examples of certain parts and/or components associated with longitudinal slide receiver 310 may include, but are not limited to, the following.

Longitudinal Slide Receiver 310 (i.e., the In-Out Receiver)
- (2) 11" channel (¼" thickness by 25½" length with a 2½" top and bottom rail);
- (8) ¾" through holes for chassis mounts in top rail of 11" channel spaced according to vehicle specifications;
- (8) 2½ gusset (5½" length by ¼ thickness);
- (2) 2½" bracing (⅜" thickness by 3' length) with a 3" by ⅜" by 2½" divider;
- (1) 6" plate (½" thickness by 36½" length);
- (4) 2" brass (⅜" thickness by 24" length);
- (14) Countersunk screws for brass (¼"-20) and (2) 5/16 course thread countersunk screws for brass; and
- (2) Cylinder mounts (2½" by 2" by ¼ " thickness channel 2½ " with ¾" pin holes centered).

Referring now to FIG. 19 illustrates an example of longitudinal slide 312 of multi-directional trailer hitch 110. Further, FIG. 20 illustrates an example orientation of longitudinal slide 312 to longitudinal slide receiver 310. Examples of certain parts and/or components associated with longitudinal slide 312 may include, but are not limited to, the following.

Longitudinal Slide 312 (i.e., the In-Out Member)
- (2) 2" by 4" Tubing (¼" thickness by 26" length);
- (2) 2½" flat-bar (⅜" thickness by 32¼" length);
- (1) 2¾" Divider (⅜" thickness by 3" length);
- (1) ¾" flat-bar (6" height by 37½" length);
- (2) ⅜" Brass (¾ width by 25" length);
- (10) Countersunk screws for brass (¼"-20) on 6" centers for top and bottom brass of main plate;
- (2) Lateral cylinder mounts—½ angle iron (2½" by 4" by 2½" length with ¾" pin holes); and
- (4) Longitudinal cylinder mounts (⅜" thickness by 2½" width by 3" length with ¾" pin holes).

Referring now to FIG. 21, FIG. 22, and FIG. 23, illustrates an example of lateral slide 314 of multi-directional trailer hitch 110. Examples of certain parts and/or components associated with lateral slide 314 may include, but are not limited to, the following.

Lateral Slide 314 (i.e., the Side-to-Side Member)
- (1) 1½" flat-bar (9" height by 14½" length with 6½" 0.812 depth recess set 1¼" from top and bottom). Vertical and horizontal ¼"/⅜" depth recessions in recessed side of flat bar that lead to a grease fitting placed in the top of the flat-bar to facilitate grease application for lateral slide;
- (1) ¾" flat-bar (9" height by 14½" length with 6½" 0 0.062 recess set 1¼" from the top and bottom);
- (8) 9/16" through-holes in ¾" plate to match bolt pattern of 1½" flat-bar bolt pattern;
- (4) ⅜" course thread bolt holes in ¾" plate to match lateral (side to side) cylinder; and
- (8) 1½" flat-bar through-holes (½" holes starting ⅝" from top and side of flat-bar set at 2¾" laterally and 7¾" form top holes moving vertically for a pattern of 4 holes positioned at one side of the flat-bar and a replicated pattern at the other side of the flat-bar).

Referring now to FIG. 24 through FIG. 29 illustrates an example of vertical hitch mount 316 of multi-directional trailer hitch 110. Examples of certain parts and/or components associated with vertical hitch mount 316 may include, but are not limited to, the following.

Vertical Hitch Mount 316 (i.e., the Up-Down Member)
- (2) 7/16" flat-bar spacers (4" width by 12½" length with 4 through-holes per spacer to match lateral slide bolt pattern);
- (2) ½" angle-iron (4" by 5¾" by 15¼" length with 4 through-holes to match flat-bar spacers, (2) ¾" pin holes and 11/16" cylinder mount hole);
- (1) ⅜" tubing (3" by 6" by 18¾" length with (9) 11/16" hitch adjustment holes set on 2" centers, (9) ¾" pin-holes set on 2" centers that are off set 1" from the hitch adjustment holes, and (1) 11/16" cylinder mount hole);
- (1) ⅜" slide flat-bar (6" width by 18¾" length, with 1⅛" width by 11" slot centered starting from top of plate and 1⅛" width by 3" slot centered starting from bottom of plate for vertical cylinder hose fitting clearance);
- (1) vertical 3/16" flat-bar cylinder cap (3" by 6½" bent 45 degrees at 4¼" with (1) 5/16" through hole for 5/16" bolt);
- (2) safety chain hook-ups (¼" by 4" by 5½" bent 45 degrees at 3¾"; and
- (2) 9/16" through holes on 2¾" centers, 2½" by 1¾" slot for safety chain hooks).

Referring now to FIG. 30 illustrates an example of ball mount 318 of multi-directional trailer hitch 110. Examples of certain parts and/or components associated with ball mount 318 may include, but are not limited to, the following.

Ball Mount 318
- (1) ½" channel (4" by 2½" by 4" length with (4) 11/16" pin-holes on 2" centers); and
- (1) ¾" Flat-bar (2½" width by 10¼" length with 90-degree angle set at 5¼" by 5" and (1) 1 1/16" through-hole for ball mount).

Examples of certain parts and/or components associated with vertical cylinder bolt spacers 320 may include, but are not limited to, the following.

Vertical Cylinder Bolt Spacers 320 (Not Shown)
- (2) 11/16" ID by 1" OD by ⅝" length; and
- (2) 11/16" ID by 1" OD by ½" length.

Referring now to FIG. 31 illustrates an example of longitudinal/lateral pin-off 322 (180) of multi-directional trailer hitch 110. Examples of certain parts and/or components associated with longitudinal/lateral pin-off 322 (180) may include, but are not limited to, the following.

Longitudinal/Lateral Pin-Off 322 (180) (Mounted to Lateral Slide)
- ½" flat-bar (5" by 2" with (2) 9/16" through holes on 2¾" centers and a
- 1¼" OD by 11/16" ID alignment bushing)

Longitudinal/Lateral Pin-Off 322 (180) (Mounted Under Vehicle) (Not Shown)
- 1½" by 3/16" square tubing (34" length with 1¼" OD by 11/16" ID locating bushing)

Referring now to FIG. 32 illustrates an example of wear protection members 324 of multi-directional trailer hitch 110. Wear protection members 324 may be used to reduce wear of metal-on-metal configurations within multi-directional trailer hitch 110. Wear protection members 324 may be formed, for example, of brass, Teflon, or any other suitably protective material. Excluding wear protection members 324, other parts of multi-directional trailer hitch 110 may be painted with, for example, black implement paint before final installation.

Referring now to FIG. 33, illustrates another example of a safety locking pin 178.

Referring now to FIG. 34A through FIG. 42, illustrates additional views of the multi-directional trailer hitch and its components in accordance with example embodiments of the invention.

Referring now to FIG. 43, FIG. 44A, and FIG. 44B, illustrates another example embodiment of the multi-directional trailer hitch 110 including adapter frame components 326 (326A and 326B). Adapter frame components 326 may be used to allow for installation of the multi-directional trailer hitch 110 on different types/makes of vehicles 190.

All the dimensions listed above with regard to the various components of multi-directional trailer hitch 110 are examples only, and other dimensions less than or greater than those examples are contemplated herein.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A multi-directional trailer hitch system, comprising:
   a. a mounting frame;
   b. a first slide assembly configured to slidably engage with the mounting frame, wherein the first slide assembly is configured to slide longitudinally in and out from the mounting frame;
   c. a second slide assembly configured to slidably engage with the first slide assembly, wherein the second slide assembly is configured to slide laterally in a side to side direction relative to the first slide assembly, wherein the second slide assembly comprises a front slide plate configured to slidably engage with a front surface of a front plate of the first slide assembly and a rear slide plate configured to slidably engage with a rear surface of the front plate of the first slide assembly, wherein the front slide plate and the rear slide plate are configured to be engageable with one another sandwiching at least a portion of the front plate of the first slide assembly in a slidable manner therebetween;
   d. a third slide assembly configured to slidably engage with the second slide assembly, wherein the third slide assembly is configured to slide vertically in an up and down direction relative to the second slide assembly; and
   e. one or more actuators configured to selectively effect slide movement of one or more of the first slide assembly, second slide assembly, and third slide assembly.

2. The multi-directional trailer hitch system of claim 1, further comprising a controller configured to selectively effect slide movement of one or more of the first slide assembly, second slide assembly, and third slide assembly.

3. The multi-directional trailer hitch system of claim 2, wherein the controller is one of wired or wireless.

4. The multi-directional trailer hitch system of claim 1, further comprising one or more locking mechanisms configured to lock the slide movement of one or more of the first slide assembly, second slide assembly, and third slide assembly.

5. The multi-directional trailer hitch system of claim 4, wherein the one or more locking mechanisms comprises one or more locking pins and one or more locking pin receivers.

6. The multi-directional trailer hitch system of claim 1, wherein the mounting frame is configured to be mountable to a rear underside portion of a vehicle.

7. The multi-directional trailer hitch system of claim 1, further comprising a hydraulic pump.

8. The multi-directional trailer hitch system of claim 7, further comprising a hydraulic fluid reservoir.

9. The multi-directional trailer hitch system of claim 7, further comprising one or more hydraulic actuators configured to effect the slide movement of one or more of the first slide assembly, second slide assembly, and third slide assembly.

10. The multi-directional trailer hitch system of claim 9, further comprising one or more control valves associated with the one or more hydraulic actuators, wherein the control valves are configured to control the flow of hydraulic fluid in and out of its corresponding one of the one or more hydraulic actuators.

11. The multi-directional trailer hitch system of claim 1, further comprising one or more wear protection members disposed on one or more surfaces of the mounting frame and the first slide assembly that are in face to face slidable contact with each other, one or more surfaces of the first slide assembly and second slide assembly that are in face to face slidable contact with each other, and/or one or more surfaces of the second slide assembly and third slide assembly that are in face to face slidable contact with each other, and wherein the wear protection members comprise brass or Polytetrafluoroethylene (PTFE).

12. The multi-directional trailer hitch system of claim 1, further comprising a trailer hitch connector mounted to the third slide assembly, wherein movement of any one or more of the first slide assembly, second slide assembly, and third slide assembly translates into movement of the trailer hitch connector in a like manner.

13. The multi-directional trailer hitch system of claim 12, wherein the multi-directional trailer hitch system is configured to move the trailer hitch connector in any one of six different directions relative to the mounting frame.

14. The multi-directional trailer hitch system of claim 13, wherein the six different directions comprise in and out, side-to-side, and up and down relative to the mounting frame.

15. The multi-directional trailer hitch system of claim 12, wherein the trailer hitch connector comprises a trailer hitch ball.

16. A method of using a multi-directional trailer hitch system, the method comprising:
 a. positioning a vehicle in close proximity to an object to be towed, wherein the vehicle comprises the multi-directional trailer hitch system and the object to be towed comprises a hitch receiver suitable for coupling with the multi-directional trailer hitch system, and wherein the multi-directional trailer hitch system comprises:
  i. a mounting frame;
  ii. a first slide assembly configured to slidably engage with the mounting frame, wherein the first slide assembly is configured to slide longitudinally in and out from the mounting frame;
  iii. a second slide assembly configured to slidably engage with the first slide assembly, wherein the second slide assembly is configured to slide laterally in a side to side direction relative to the first slide assembly; wherein the second slide assembly comprises a front slide plate configured to slidably engage with a front surface of a front plate of the first slide assembly and a rear slide plate configured to slidably engage with a rear surface of the front plate of the first slide assembly, wherein the front slide plate and the rear slide plate are configured to be engageable with one another sandwiching at least a portion of the front plate of the first slide assembly in a slidable manner therebetween;
  iv. a third slide assembly configured to slidably engage with the second slide assembly, wherein the third slide assembly is configured to slide vertically in an up and down direction relative to the second slide assembly;
  v. a trailer hitch connector mounted to the third slide assembly; and
  vi. one or more actuators configured to selectively effect slide movement of one or more of the first slide assembly, second slide assembly, and third slide assembly;
 b. activating the multi-directional trailer hitch system;
 c. positioning the hitch connector of the multi-directional trailer hitch system to a desired position for coupling to the hitch receiver of the object to be towed;
 d. coupling the hitch connector to the hitch receiver of the object to be towed;
 e. positioning the multi-directional trailer hitch system with the object to be towed coupled thereto to a towing position; and
 f. securing the multi-directional trailer hitch system in the towing position.

17. The method of claim 16, wherein the multi-directional trailer hitch system further comprises a controller, wherein the controller is configured to effect positioning of the multi-directional trailer hitch system.

18. The method of claim 16, wherein the multi-directional trailer hitch system is configured to move the hitch connector in any one of six different directions relative to the mounting frame.

19. The method of claim 16, wherein the hitch connector comprises a trailer hitch ball.

* * * * *